US008260627B2

(12) United States Patent  
Davidson

(10) Patent No.: US 8,260,627 B2  
(45) Date of Patent: Sep. 4, 2012

(54) SYSTEM AND METHOD FOR CREATING, MANAGING, EVALUATING, OPTIMIZING CREATING BUSINESS PARTNERSHIP STANDARDS AND CREATING REUSEABLE KNOWLEDGE AND BUSINESS INTELLIGENCE FOR BUSINESS PARTNERSHIPS AND ALLIANCES

(76) Inventor: William A. Davidson, Chicago, IL (US)

( * ) Notice: Subject to any disclaimer, the term of this patent is extended or adjusted under 35 U.S.C. 154(b) by 217 days.

(21) Appl. No.: 12/725,449

(22) Filed: Mar. 16, 2010

(65) Prior Publication Data

US 2010/0179845 A1  Jul. 15, 2010

Related U.S. Application Data

(63) Continuation of application No. 10/992,491, filed on Nov. 17, 2004, now abandoned.

(51) Int. Cl.
*G06Q 10/00* (2012.01)
*G06Q 40/00* (2012.01)
(52) U.S. Cl. .......................................... 705/1.1; 705/38
(58) Field of Classification Search ................... 705/1.1, 705/13, 14, 17, 21, 23, 25, 26, 27, 36, 38, 705/39

See application file for complete search history.

(56) References Cited

U.S. PATENT DOCUMENTS

| | | | |
|---|---|---|---|
| 4,627,818 A | 12/1986 | Von Fellenberg | |
| 5,795,155 A | 8/1998 | Morrel-Samuels | |
| 6,007,340 A | 12/1999 | Morrel-Samuels | |
| 6,119,097 A | 9/2000 | Ibarra | |
| 6,556,974 B1 | 4/2003 | D'Allessandro | |
| 7,593,861 B2 | 9/2009 | Morrel-Samuels | |
| 2002/0099578 A1 | 7/2002 | Eicher et al. | |
| 2002/0099579 A1 | 7/2002 | Stowell et al. | |
| 2003/0124497 A1 | 7/2003 | Weeks | |
| 2003/0125962 A1 | 7/2003 | Holliday et al. | |
| 2003/0149613 A1* | 8/2003 | Cohen et al. | 705/11 |
| 2003/0171976 A1 | 9/2003 | Farnes et al. | |
| 2003/0177027 A1 | 9/2003 | DiMarco | |
| 2004/0068431 A1* | 4/2004 | Smith et al. | 705/10 |

OTHER PUBLICATIONS

G.Q. Huang et al., Brokering the customer-supplier partnership in product design and realization over the World Wide Web, 2003, IIE Transactions, pp. 369-378.*

* cited by examiner

*Primary Examiner* — Fonya Long
(74) *Attorney, Agent, or Firm* — Aka Chan LLP

(57) ABSTRACT

A system and method for determining business partner value by creating weighted metrics for identifying, evaluating and selecting a business partner for a company; creating a business agreement and weighted metrics for evaluating the agreement; creating weighted metrics for ongoing management of the partner; and managing the partner by ongoing periodic evaluation of the weighted metrics for partner selection, agreement, and management. Both company and partners may participate in the evaluation on an ongoing basis (e.g., once per month or once per quarter) rather than an annual review. In one embodiment, weighted metrics of partner selection, agreement, and management are reported, charted and graphed providing for visual evaluation and side-by-side comparison of the perceptions of company and partner for optimization of the business relationship and prediction of future performance.

14 Claims, 35 Drawing Sheets

| | A | B | C | D |
|---|---|---|---|---|
| 1 | New Invention Data Calculator Process | | | |
| 2 | | | Score | Value |
| 3 | Partner Value | 10.00 | | 8.763 |
| 4 | | | | |
| 5 | Partner Selection | 0.10 | 7.165 | 0.716 |
| 6 | Partner Agreement | 0.15 | 8.504 | 1.276 |
| 7 | Partner Management | 0.75 | 9.028 | 6.771 |
| 8 | | | | |
| 9 | Partner Selection | | | |
| 10 | Strategic Fit | 0.25 | 5.113 | 1.278 |
| 11 | Partnership Experience | 0.10 | 8.350 | 0.835 |
| 12 | Financial Data | 0.10 | 8.950 | 0.895 |
| 13 | Geographic Coverage | 0.25 | 7.575 | 1.894 |
| 14 | Partner Resources | 0.15 | 7.725 | 1.159 |
| 15 | Non-Quantitative Criteria | 0.15 | 7.360 | 1.104 |
| 16 | Total | 1.00 | | 7.165 |
| 17 | | | | |
| 18 | Partner Agreement | | | |
| 19 | Agreement Processes | 0.30 | 8.150 | 2.445 |
| 20 | Marketing and Advertising | 0.30 | 8.675 | 2.603 |
| 21 | Training | 0.25 | 7.825 | 1.956 |
| 22 | Terms and Conditions | 0.15 | 10.000 | 1.500 |
| 23 | Total | 1.00 | | 8.504 |
| 24 | | | | |
| 25 | Partner Management | | | |
| 26 | Revenue Generation | 0.70 | 9.444 | 6.611 |
| 27 | Other Revenue Generation | 0.03 | 4.494 | 0.135 |
| 28 | Sales Generation Activities | 0.07 | 9.088 | 0.591 |
| 29 | Alliance and Channel Management | 0.04 | 8.425 | 0.337 |
| 30 | Sales Training | 0.07 | 8.275 | 0.538 |
| 31 | Technical Training | 0.05 | 8.475 | 0.424 |
| 32 | Support Operations | 0.02 | 8.800 | 0.176 |
| 33 | Relationship Building | 0.03 | 7.225 | 0.217 |
| 34 | Total | 1.00 | | 9.028 |

| Partner Management Criteria | Measurements | | | Cross Functional Impact | | | | |
|---|---|---|---|---|---|---|---|---|
| | Vendor Results | Partner Results | Avg. Score | Executive Management | Sales | Professional Services | Operations | Finance |
| LATE PAYMENTS SATISFACTION | | | | | | | | |
| A/R Satisfaction | 3 | 7 | 5 | X | | | X | X |
| Product Delivery | 3 | 7 | 5 | | | | X | X |
| Partner on Time Payments | 2 | 9 | 5.5 | | | | X | X |
| Joint Sales Opportunity Satisfaction | 8 | 6 | 7 | X | X | | X | |
| Number of Sales Leads | 8 | 4 | 6 | | | | | |
| Right Resources at the Right Time | 9 | 6 | 7.5 | | X | X | | |
| DISPUTE RESOLUTION SATISFACTION | | | | | | | | |
| New Customer Sales | 7 | 4 | 5.5 | | X | X | | |
| Sales Generated Without Leads | 5 | 6 | 5.5 | | X | X | | |
| Right Resources at The Right Time | 3 | 5 | 4 | | X | X | | |
| Partner Support Cost | 8 | 4 | 6 | | X | X | | X |
| Channel Manager Effectiveness | 4 | 6 | 5 | X | X | | | |
| Sales Training Effectiveness | 8 | 5 | 6.5 | | X | | | |
| Partner on Time Payments | 9 | 4 | 6.5 | | X | | | |
| Relationship Trust | 4 | 8 | 6 | X | X | | X | X |
| Partnership Value | 6 | 4 | 5 | X | X | | | |
| | 7 | 5 | 6 | X | X | X | | |
| TECHNICAL TRAINING SATISFACTION | | | | | | | | |
| Partner Support Cost | 8 | 4 | 6 | | X | X | | |
| Sales Generated without Leads | 6 | 5 | 5.5 | | X | X | | X |
| Number of Leads | 3 | 5 | 4 | | X | | | |
| Quantity of Disputes | 8 | 4 | 6 | | X | | | |
| Right Resources at the Right Time | 9 | 9 | 9 | X | X | | | |
| Overall Partner Satisfaction | 8 | 4 | 6 | X | X | X | | |
| Escalation Satisfaction | 6 | 5 | 5.5 | | X | | | |
| Relationship Trust | 7 | 4 | 5.5 | X | X | X | | X |
| | 7 | 5 | 6 | | X | X | | |

Figure 20A

| | A | B | C | D | E | F | G | H | I |
|---|---|---|---|---|---|---|---|---|---|
| 38 | PRODUCT SUPPORT SATISFACTION | | | | | | | | |
| 39 | Number of Leads | 5 | 3 | 4 | | X | X | | |
| 40 | Sales Generated without Leads | 7 | 4 | 5.5 | | X | | | |
| 41 | Sales Material Availability | 3 | 2 | 2.5 | | X | | | |
| 42 | Right Resources at Right Time | 7 | 5 | 6 | | X | | | |
| 43 | Channel Team Effectiveness | 8 | 4 | 6 | | X | X | | |
| 44 | Sales Training Value | 7 | 8 | 7.5 | X | X | | | |
| 45 | Technical Training Value | 8 | 3 | 5.5 | | X | X | | |
| 46 | AR Support Satisfaction | 9 | 4 | 6.5 | | X | | | X |
| 47 | | 4 | 7 | 5.5 | X | | | | |
| 48 | INCREASED PARTNER SALES | | | | | | | | |
| 49 | New Customer Sales | 2 | 6 | 4 | X | X | | | |
| 50 | Sales Generated Without Leads | 2 | 7 | 4.5 | X | X | | | |
| 51 | Sales Material Availability | 2 | 6 | 4 | | X | | | |
| 52 | Sale Training Quality | 8 | 8 | 8 | | X | | | |
| 53 | Pre Sales Product Training Effectiveness | 8 | 9 | 8.5 | | X | | | |
| 54 | After Sales Support | 9 | 7 | 8 | | X | | | |
| 55 | | 9 | 8 | 8.5 | | X | X | | |

Figure 20B

| | Measurements | | | Partner Selection Group | Partner Selection Category | Partner Selection Criteria |
|---|---|---|---|---|---|---|
| Partner Selection Categories | | | | | | |
| Strategic Fit | | | | | | |
| Partner Experience | | | | | | |
| Financial Data | | | | | | |
| Geographic Coverage | | | | | | |
| Partner Resources | | | | | | |
| Non-Quantitative Criteria | | | | | | |
| | | | | | | |
| Partner Management Criteria | Vendor Results | Partner Results | Avg. Score | | | |
| LATE PAYMENTS SATISFACTION | | | | | Financial Fit | Acceptable Credit |
| A/R Satisfaction | 3 | 7 | 5 | | Financial Fit | Acceptable Credit |
| Product Delivery | 3 | 4 | 3.5 | | Partner Resources | Operations |
| Just Sales Opportunity Satisfaction | 2 | 3 | 2.5 | | Financial Fit | Acceptable Credit |
| Number of Sales Leads | 8 | 6 | 7 | | Strategic Fit | Well trained sales staff |
| Channel Manager Effectiveness | 8 | 4 | 6 | | Non-Quantitative Criteria | Willing to share sales opportunity information |
| Rapid Resources at the Right Time | 9 | 6 | 7.5 | | Partner Resources | Sales/Pre sales ratio |
| | | | | | | |
| DISPUTE RESOLUTION SATISFACTION | | | | | | |
| New Customer Sales | 7 | 6 | 6.5 | | Non-Quantitative | Company Leadership |
| Sales Generated Without Leads | 5 | 6 | 5.5 | | Non-Quantitative | Willing to share sales opportunity information |
| Rapid Resources at The Right Time | 3 | 5 | 4 | | Non-Quantitative | Willing to share account information |
| Partner Support Cost | 8 | 6 | 7 | | Non-Quantitative | Willing to train/invest sales resources |
| Channel Manager Effectiveness | 4 | 6 | 5 | | Partner Resources | Customer support |
| Sales Training Effectiveness | 9 | 5 | 7 | | Partnership Experience | Shared channel experience |
| Partner on Time Payments | 9 | 4 | 6.5 | | Non-Quantitative | Willing to train/invest sales resources |
| Relationship Trust | 4 | 8 | 6 | | Financial Fit | Acceptable Credit |
| Partnership Value | 6 | 4 | 5 | | Non-Quantitative | Ease of conflict resolution |
| | 7 | 5 | 6 | | Non-Quantitative | Company Values |

Figure 21A

| | A | B | C | D | E | F | G |
|---|---|---|---|---|---|---|---|
| 39 | TECHNICAL TRAINING SATISFACTION | | | | | | |
| 40 | Partner Support Cost | 3 | 1 | 5.5 | | Non-Quantitative | Willingness to train/invest sales resources |
| 41 | Sales Generated without Leads | 5 | 6 | 4 | | Partner Resources | Internal Support |
| 42 | Number of Leads | 3 | 5 | 6 | | Partner Resources | Pre-sales |
| 43 | Quantity of Disputes | 9 | 4 | 9 | | Partner Resources | Product Implementation |
| 44 | Right Resources at the Right Time | 8 | 4 | 9 | | Partner Experience | Minimal Channel conflict |
| 45 | Cost of Partner Satisfaction | 6 | 5 | 6.5 | | Non-Quantitative | Willingness to invest train/invest presales resources |
| 46 | Escalation Satisfaction | 7 | 4 | 6.5 | | Non-Quantitative | Willingness to continuously enable and improve partnership trust |
| 47 | Relationship Trust | 7 | 9 | 6 | | Non-Quantitative | Ease of conflict resolution |
| 48 | | | | | | | Promotes goodwill |
| 49 | PRODUCT SUPPORT SATISFACTION | | | | | | |
| 50 | Number of Leads | 5 | 3 | 4 | | Partnership Experience | Product Experience |
| 51 | Sales Generated without Leads | 7 | 4 | 5.5 | | Partner Resources | Internal Support |
| 52 | Sales Material Availability | 3 | 2 | 2.5 | | Partner Resources | Pre-sales |
| 53 | Right Resources at the Right Time | 7 | 6 | 6 | | Partner Resources | Product Implementation |
| 54 | Channel Team Effectiveness | 8 | 4 | 9 | | Non-Quantitative | Willingness to train/invest presales resources |
| 55 | Sales Training Value | 7 | 6 | 7.5 | | Partnership Experience | Product Experience |
| 56 | Technical Training Value | 9 | 3 | 5.5 | | Non-Quantitative | Willingness to train/invest sale resources |
| 57 | AR Support Satisfaction | 9 | 4 | 6.5 | | Partner Experience | Product Experience |
| 58 | | 3 | 7 | 9.5 | | Financial Fit | Acceptable costs |
| 59 | INCREASED PARTNER SALES | | | | | | |
| 60 | New Customer Sales | 2 | 6 | 4 | | Geographic Coverage | Sales presence regional |
| 61 | Sales Generated (Without Leads) | 2 | 7 | 4.5 | Strategic Fit | Partner can assist in Maximizing Revenues | Shorter Sales Cycle |
| 62 | Sales Materials Availability | 2 | 6 | 4 | Strategic Fit | Partner can assist in Maximizing Revenues | Greater Geographic Coverage |
| 63 | Sales Training Quality | 9 | 6 | 6 | Strategic Fit | Partner can assist in Maximizing Revenues | Management Commitment |
| 64 | Pre Sales Product Training Effectiveness | 9 | 9 | 9.5 | | Non-Quantitative | Willingness to train/invest in sales resources |
| 65 | After Sales Support | 9 | 7 | 8 | | Non-Quantitative | Willingness to train/invest in presales resources |
| 66 | | 9 | 8 | 9.5 | | Partner Resources | Customer support |

Figure 21B

Partner Agreement Categories

- Agreement Process
- Marketing and Advertising
- Training
- Terms and Conditions

Partner Management Criteria

| | Measurements | | | | |
|---|---|---|---|---|---|
| | Vendor Results | Partner Results | Avg. Score | Partner Agreement Categories | Partner Agreement Criteria |
| LATE PAYMENTS SATISFACTION | | | | | |
| AP Satisfaction | 3 | 7 | 5 | Terms and Condition | |
| Product Delivery | 3 | 7 | 5 | Terms and Condition | |
| Partner on Time Payments | 8 | 3 | 5.5 | Terms and Condition | |
| | 2 | 3 | 3 | Terms and Condition | |
| Joint Sales Opportunity Satisfaction | 8 | 6 | 7 | Training | Sales training |
| Number of Sales Leads | 8 | 4 | 6 | Alliance Process | Provide effective sales process |
| Right Resources at the Right Time | 9 | 6 | 7.5 | Training | Technical training |
| DISPUTE RESOLUTION SATISFACTION | | | | | |
| New Customer Sales | 7 | 4 | 5.5 | Alliance Process Marketing and Advertising | Follow rules of engagements Provides leads |
| Sales Generated Without Leads | 6 | 8 | 6.5 | Excellent Sales Processes | Provide effective sales process |
| Right Resources at The Right Time | 3 | 3 | 3 | | |
| Partner Support Cost | 8 | 3 | 5 | Training | Technical training |
| | 1 | 9 | 5 | Training | Channel support training |
| Channel Manager Effectiveness | 8 | 5 | 6.5 | Training | Channel support training |
| Sales Training Effectiveness | 9 | 4 | 6.5 | Training | Sales training |
| Partner on Time Payments | | 4 | | Terms and Conditions | |
| Relationship Trust | 6 | 4 | 5 | Alliance Process | Provides effective process |
| Rules of Engagement | | | | Alliance Process | Follows rules of engagement |
| Partnership Value | 7 | 5 | 6 | | |

SYSTEM AND METHOD FOR CREATING, MANAGING, EVALUATING, OPTIMIZING CREATING BUSINESS PARTNERSHIP STANDARDS AND CREATING REUSEABLE KNOWLEDGE AND BUSINESS INTELLIGENCE FOR BUSINESS PARTNERSHIPS AND ALLIANCES

CROSS-REFERENCE TO RELATED APPLICATIONS

This patent application is a continuation of U.S. patent application Ser. No. 10/992,491, filed Nov. 17, 2004, which is incorporated by reference along with all other references cited in this application.

BACKGROUND OF THE INVENTION

The present invention relates to the field of creating, managing, evaluating, and optimizing business partnerships and alliances. Included in the present invention is that it relates to the field of creating measurements that reflect industry standards for the field of invention and that it also relates to the field of creating knowledge and business intelligence data and information in the field. It includes partnerships and alliances which operate in a vendor/vendee capacity by assigning weighted and comparative metrics to the following criteria: Partner Selection, Partner Agreement, and Partner Management which, in combination, track a Partner Value.

It includes Customer Support Relationships (partnerships) between companies and customers and it includes Sales Force SFA Relationships (partnerships) between companies and customers. It includes additional application in pharmaceuticals, Biotechs, Manufacturing, Financial Services, and other industries where there are partnerships between two or more separate business entities.

The convergence of three business issues relating to alliances, sales channels and business partnerships creation and management has led to the substantial need for the development of a new system and method to create, manage, evaluate, optimize, create business partnership standards and create re-useable knowledge and business intelligence as it applies to the alliances, channels and business partnerships. These business issues are the need to improve alliance, channel and business partnership effectiveness in order to achieve desired results; the need to quickly capture knowledge relating to best practices and the impact of program, process, product and personnel changes as baby boomers will soon retire and knowledgeable staff continue to transition to other companies and; the need to create business intelligence and knowledge which can only be accurate and predictable if information on all partnership aspects are captured.

Since the year 2000 to present, as the economy slowly comes out of the recession, companies are continuing to seek ways to increase efficiency and productivity while continuing to drive out costs. This approach has been very effective in assisting companies in maintaining profitability. Employees are more productive. Expenses are tightly controlled. There are very few places left to create efficiency on many companies' income statements and balance sheets. Doing more with less does have benefits to the bottom line. However, too much efficiency greatly impacts employee effectiveness. Therefore, productivity gains may not be as great as companies believe them to be.

As baby boomers start to retire in the next five years, as employees change jobs and go to work for other companies, and as the economy becomes more global, it will become more and more critical to capture the personal knowledge and experience held by these employees. By understanding the Strategy Evolution and Impact of Demand Generation and Customer Support Optimization on Business Intelligence, Corporate Value and Corporate Strategy, companies can greatly improve effectiveness and their ability to capture significant knowledge that will result in increased revenues and further decreased costs.

Over the past two decades, there has been an evolution in customer support and business process improvement. It started with Information Technology Service Management (ITSM), also called Help Desk, to support internal computer users. Initially, for those of us that remember, this was to support internal customers using mainframe systems that were so large that they could fill a room. As the acceptance of personal computers (PCs) and personal computer (PC) servers increased and demand for internal customer support increased, pencils, pens, paper and spreadsheets became too inefficient to cost effectively support these operations. Companies had two choices. They could build their own applications at great expense or look to the outside and purchase a software solution that would cost effectively, automate their helpdesk processes. This automation greatly increased efficiency and, as the helpdesk market matured, drove out costs. As time has passed, business process management, Six Sigma and ITIL have been applied to these support processes in order to further increase support efficiency and customer satisfaction.

Companies measure process efficiency to determine additional areas and processes that can be improved in order to increase return on investments (ROIs). Service level agreements have become the norm. Processes have been created to provide self service to company internal customers in order to increase efficiency and decrease support costs. Solution knowledge bases have been created to further decrease costs and improve efficiency and customer satisfaction.

Over the last decade, there has been an evolution in the automation of customer support processes. Customer Relationship Management (CRM) has steadily grown as a mission critical application in almost all companies. Customer Service, as it was once called, was a labor intensive, inefficient and costly business function. As competition in almost all markets has increased, cost management and customer satisfaction have become critical areas to manage, the need to automate support processes became critical to a company's success. Companies again had two choices. Companies could build an in-house solution or they could purchase a software solution from the outside. This automation greatly increased efficiency and, as the customer support market matured, drove out costs. As time has passed, business process management and Six Sigma have been applied to these support processes in order to further increase support efficiency and customer satisfaction. Companies measure process efficiency to determine additional areas and processes that can be improved in order to increase ROIs. Quantitative service level agreements have become the norm. Processes have been created to provide self service to customers in order to increase efficiency and decrease support costs. Solution knowledge bases have been created to further decrease costs and improve efficiency and customer satisfaction.

As the market moves forward and the need to further increase customer satisfaction, business intelligence is becoming the next "Killer App" for customer support. Not only are companies dedicating resources to product research, but they are also gathering human capital quality data to gain further insight into the customer in order to improve numerous areas within a company. For example, instead of just asking a respondent "do you like the red product?", companies are starting to ask and electronically capture why the respondent likes or does not like the red product to gain further insight. Some companies are even asking respondents what would the companies need to do to the product for the respondents to buy it even if it was red. At some point, there will be integration between business intelligence and predictive modeling. As more data is captured regarding how qualitative information impacts quantitative results, accurate predictions, not only regarding customer support, will be developed. This will result in great progress towards company optimization.

Sales Force Automation has become a standard application in most companies. There has been a recognized need to assist the sales warriors in increasing their efficiency. Salespeople seem to forget about their paperwork and concentrate on selling. Stacks of paper are piled on their desks. If someone were to walk by, they would know that the desk was that of a salesperson. Sometimes, it seems like the salesperson with the most stacks of paper is the most successful. In the last decade, there has been a significant increase in the sale of Sales Force Automation software.

This is for a few reasons. The first is to gain more efficiency in selling a company's product. It has been felt that if a salesperson is better organized, the salesperson will have more time to sell. The tool houses quantitative information regarding accounts, contacts, sales quotes, forecasts, calendars and other vital account information. It tracks the quantitative aspects of the relationship. Salespeople are often the highest paid individuals in a company. Their ability to generate demand and revenue is critical to the success of the company. Their contacts are valuable assets. If a salesperson should leave and their account information has not been captured, the company must recreate those contacts and relationships at great expense and time. SFA tools also provide insight into how the salesperson spends his or her time. This can be used to capture knowledge on sales best practices and to identify areas where the salesperson can improve. As competition in almost all markets has increased, sales efficiency, cost control and account knowledge have become critical areas to manage, the need to automate sales and sales support processes has became critical to a company's success. A company's measure of a salesperson's success is by performance. They have also added the salesperson's proficient and repetitive use of the company's SFA tool.

As companies apply business process management and Six Sigma to its sales function, sales processes and knowledge capture can be improved. If a company's ability to increase knowledge improves, the company can then begin to apply business intelligence to its sales model which in turn will lead to a greater competitive advantage and ability to consistently increase revenue even if a salesperson should leave. SFA tools can be integrated with CRM tools to provide even greater knowledge regarding customers. The combination of SFA tools, CRM tools and then adding the capture of human capital quality data will lead to even greater business intelligence and a company's ability to reduce costs, accurately predict revenue and further improve a company's overall performance, and, ROI and EPS.

So what does all this previous history have to do with increasing the Partner Value of business partnerships and alliances through creating, managing evaluating, optimizing, creating industry standards and creating knowledge and business intelligence? The creation and management of alliance and business partnerships is one of the last bastions of business that has a significant need to have its processes automated, managed, and optimized. As the cost of direct sales organization increases, the size of the workforce pool decrease and the baby boomers retire, alliance and business partnerships will become more and more critical to a company's success. As efficiencies have increased in the areas of Helpdesk, CRM, and SFA, costs have been reduced and productivity has increased. Most alliance, channel, and business partnership processes are not automated. Some companies use CRM software, some use SFA software, some use paper, pencils, and spreadsheets and others use PRM software. The most efficient are, of course, the automated solutions. Current trend and marketing information indicate that PRM is the next support growth market. PRM vendors market their solutions with strong ROI benefits in the areas of increased efficiency and decreased costs. PRM solutions, unlike CRM and SFA solutions have been designed specifically to automate the creation and management of alliances, channels, and business partnerships.

How have vendors automated partnering activities and what is left to be done? First, vendors utilized the web to provide partners with fast and easy access to commonly needed information as the web evolved. Partner intranets were also deployed to provide the vendor's employees relevant partner information. Typical information posted on these sites would be company profiles, product and service information, key contacts, sales presentations and white papers. Vendors continued to increase the productivity gains and cost reductions through automation by implementing systems that allowed partners to configure and order products online. Partners have also been provided with online support, web based training and certification testing.

PRM solutions were introduced in the last five to six years. Since their introduction, they have been used to further automate alliance, channel, and business partnership processes. Vendors are starting to organize and consolidate their partners contact, pipe line and contract information as well as, marketing information. They have been able to automate lead distribution and campaign management processes. These systems have increased efficiency in managing partner information and processes, but have little impact on improving partner effectiveness.

Vendors have been using legacy systems to track performance of their resellers, distributors and their own reseller/distributor account managers. Common practice with SIs and ISVs is to assign a percentage of the revenue based on the partner's level of contribution in developing new sales or participation in closing an existing sale with the vendor's end user salesperson. This is a manual process and the assignment of sales credit is arbitrary which can often cast doubt on the creditability of performance data.

Vendors use PRM and other tools to gather partner feedback on vendor performance, marketing issues, and products. Most vendors use surveys as the primary method. This method can be compared to that of gathering customer data as it applies to feedback using CRM tools. Vendors don't ask their partners the why and how questions as part of the feedback process. Results from the partner surveys are not compared to the responses of what the vendor may answer to the same set of questions. Human capital quality data from partners is not captured.

Partners are not unlike end customers. They control what is sold and to whom. As the workforce shrinks, baby boomers retire and employees change companies, the partners' opinions will become more important. Surveys are most often conducted once a year. The survey results are seldom compiled to show year over year comparisons with the exception of the quantitative data. Knowledge is not created. The evolving strategy has stopped here.

How can the strategy continue? The same way that customer relationship management has, but with additional improvement. Business intelligence and predictive modeling be applied to business partnerships, channels and alliances.

The capture of all reusable knowledge regarding all aspects of partnership creation, management and performance will provide vendors with the ability to improve effectiveness, optimize results, and substantially decrease costs in numerous areas through analysis of historical data, current market trends and human capital qualitative data. Business process management principles will be applied to weak areas of partnership programs to improve processes. Information will be continuously captured so that partnerships can be optimized. Once a partnership or many partnerships are nearly optimized the data can be used to create business intelligence and enable the use of predictive modeling.

What does the future hold? CRM, SFA, and PRM will be used to create knowledge. Initially, this will be done separately. Business process management solutions will be used to improve processes along the way. All of the functional areas will include qualitative and quantitative feedback loops to enable continuous feedback and create knowledge. Today they do not. The new system and method can allow data to be analyzed in CRM and SFA as it is for partnerships. Current market trends and the knowledge that is captured over time will be combined with research and feedback and be used as business intelligence. Finally, all of the components of CRM, SFA, and PRM will be combined so that predictive modeling tools that use all available quantitative data, qualitative data and current information will accurately predict revenue opportunities, revenues that will be generated, areas where costs can be decreased, processes that can be improved and there root cause problems across cross-functional areas, and, what can be done to continuously optimize company value. The new system or method can be used as the core component of these combined processes so that a single Partner Value—that can now be called Demand Value, can be calculated.

It will be critical for companies to capture useable knowledge that considers all variables that can both aid and impact success. These variables include both quantitative and qualitative variables. A strong effectiveness strategy based on both of these variable sets may become the most important aspect of strong efficiency strategy.

Companies are faced with the ongoing task of integrating numerous disparate systems in order to improve efficiency. In almost every facet of a business, there are cross-functional dependencies that can impact results. It has been difficult to improve a department or function's processes much less the cross-functional processes that the department does not own or control and yet, depends on. Business process management tools are aiding in the fight. As companies are improving their department processes and some cross-functional processes, they seek to add the creation of business intelligence as the next step.

However, not seen in the prior art is a comprehensive approach for the creation, management, evaluation, optimization, creation of industry standards, and, creation of knowledge and business intelligence through a closed system and method that includes a core system and method as its foundation for calculating a single Partner Value that represents an algorithm of all inputs. There has been no method wherein the continuous generation of partner value has been evaluated.

If a company uses channels and alliances to sell its products, those channels and alliances should have the same expertise as the company's direct sales organization. It should be transparent to the customer, whether the selling organization is the company's direct sales organization or one of its partners. As a company creates value in its partners, it will win more sales and accordingly generate more revenues because it will increase its effective coverage in the marketplace.

Most companies use a standard channel and alliance model in the selection, negotiation and management of its channel and alliance partners, as shown in FIG. 1. Most companies spend comparatively little time selecting and coming to agreement with its partners. They choose to spend more of their initiatives in channel and alliance management, i.e., managing the relationship. Managing the relationship generally has meant driving revenue thought the channel.

Back in the early 1990s, partners would ask to sign up to resell a product and, if they had the financial and market coverage ability, they were generally signed on as partners.

As the markets that were called on became saturated with a company's product or its competitor's product, software and hardware margins have shrunk, commissions to the direct sales force decreased and all sales became competitive. A company's direct sales force, including its management, have often tried to take a large percentage of all hardware and software opportunities directly to the company and bypassed the partner sales organization in order to increase margins and keep the direct sales organization intact. This has been done because of the greater expertise of the direct sales organization. Channel and alliance partnerships are becoming partnerships in name only.

Partner selection has generally been comprised of quantitative data as to the size of the organization, geographic reach, and ability to pay for sold products. Little time is spent on qualitative data such as management philosophy, company strategy, and hidden agendas. When a company enters into a partnership, both companies should know as much about and agree upon the qualitative data as they do about the quantitative data in order such as management philosophy, company strategy, and hidden agendas. When a company enters into a partnership, both companies should know as much about and agree upon the qualitative data as they do about the quantitative data in order to generate partner value.

Partner agreements most often reflect the terms and conditions of the agreement between the companies and nothing more. As stated above, in a true value generating partnership, it should be transparent to the customer whether he or she is working with a direct sales organization or a channel or alliance organization. In order to generate value, an agreement needs to be more than just terms and conditions. It must provide for the tools required to generate value and thus revenue and also for the accountability of the partnership.

Partner management is the interfacing with the channel and alliance partner. After a partner agreement has been signed, partner management has meant the tracking of a partner's activities that will lead to sales. It includes such items as sales forecasting, lead follow up, and number of trained product consultants. It tracks the concerns of the company, namely, sales revenue. In order to generate partner value, which will lead to the generation of revenue, companies need to effectively manage the relationship.

What is missing today in most channel and alliance partnerships is a lack of improving the relationship and a lack of improving the relationship using a repeatable system and method. If a customer values the relationship with its vendor, that customer will continually buy from that vendor. In the same way, if a partner sees that continuously improving value in a channel or alliance relationship, that partner will strive to generate revenues and improve the relationship.

Companies today are moving towards improving their channel and alliance relationships. They are creating metrics to track channel and alliance partner satisfaction. Typically, surveys are used to track some areas of the partner satisfaction. They most often ask questions about how satisfied the partner is regarding the partner's relationship with the company as it relates to the tools and information that the partner needs to generate revenue.

Partner management is the primary way to improve the partnership relationship. The key to increasing partner value is to capture both quantitative and qualitative metrics and then continuously improve the partner selection and partner agreement processes as well as the partner management processes. It has been identified that there are numerous relationships between the components that make up selection, agreement, and management. As these sums of these three components of the partner life cycle are improved, partnership value increases and thus, the expectations of the parties to the relationship will continue to be met on a long term basis. This will lead to meeting or surpassing the expectations of the partnership. The most often used standard approach to partner management does not address the continuous improvement of the partnership.

Further, when the system and method of calculating a Partner Value is used as it can apply to relationships with employees, partners, customers and sales people, and, when it also includes weighted values for outside inputs such as market research, customer feedback, and product research, in other words, adding CRM, SFA, and research together with PRM and the new system and method, and, then this Partner Value is calculated, all areas that need to be improved in relationships are identified and all of a companies potential product demand can be calculated. The new system and method is different from all predictive modeling and partnering tools, technologies and systems and methods, because it also includes the unseen, qualitative variables of behavior and culture as they impact need for demand and delivery.

So, it can be concluded that the new system and method allows companies to improve the performance of partnerships and allows them to predict future performance. In addition, when the new system and method is applied to company support and customer relationships and company sales and customer/prospect relationships, and when it includes weighted research variables, total company demand can be predicted. It is because of the similarity of process that the Demand Value can be calculated. In CRM, there is customer selection, customer agreement and customer management. In SFA, there is customer selection, customer agreement and customer management. These processes are very similar to partner selection, partner agreement and partner management as far as their ability that when weighted and combined, can calculate a very accurate demand value.

In reviewing the prior art regarding published and issued patents, there are a number of patents that are somewhat related to the area of business relationship analysis in a traditional and commonly understood sense. For example, U.S. patent application Ser. No. 10/379,188 filed by A. DiMarco discloses the use of a talent management system that helps organizations attract, develop and retain critical talent through computer aided visualization and analysis of various criteria, including a career view, a visual resume, an autobiography, self assessment, knowledge data, project experiences, etc., which makes it easier for potential employers to assemble and analyze desired criteria regarding potential employees. U.S. patent Ser. No. 10/034,820 filed by D. Weeks uses a variety of objects placed upon a table and manipulated by the user to characterize and reveal certain personality traits which can then be used to categorize which types of career roles are most suited to the individual.

Further, U.S. patent Ser. No. 10/094,034 filed by C. Farnes, et al. discloses a method for assessing performance of a customer experience of an organization. Only a customer survey is conducted, and this is not optimized with a business organization survey. However, this method is only directed for determining a model and evaluation of core competency and it is not directed to graphing or developing a means for optimizing the relationship between business partners. Another interesting patent disclosure relating to this area is disclosed in U.S. patent application Ser. No. 10/062,688 filed by M. Cohen, et al., which discloses a computer-implemented method and system for assessing performance related data from a set of performers, but it does not analyze a business relationship from the view of both a vendor and vendee. U.S. patent application Ser. No. 10/028,309 filed by Holliday, et al. discloses a system and process for evaluating a business entity's success in developing new business, but does not further analyze other aspects of business relationships.

Another business system related disclosure found in the prior art is U.S. Pat. No. 6,556,974 issued to D'Alessandro which discloses a method for evaluating a current business relationship, but this is only by taking the surveys of employees and other persons to be evaluated in the survey which relate to various aspects of the business operations. Again, it does not evaluate or optimize a business partner relationship.

Still a further interesting patent disclosed in this area is U.S. patent application Ser. No. 10/279,159 filed by P. Morrel-Sammuels which related to a method of providing employee assessment services including negotiating with an employer to administer surveys to employees and obtaining performance metrics relating to the employer's business performance. The survey is administered over the Internet. Similarly, U.S. Pat. Nos. 5,795 and 6,007,340 issued to P. Morrell-Sammuels discloses an assessment tool which presents a variety of statements to an individual, and the individual is requested to analyze the statements and provide a response for the purpose of determining the leadership capabilities of the individual. Other interesting patents in the prior art are U.S. Pat. No. 6,119,097 issued to D. Iberra which discusses a system and method for quantification of human performance factors, and U.S. Pat. No. 4,627,818 issued to VonFellenberg which discloses a system for psychological testing of individuals which may assess the empathy, willingness to learn and sociability, as well as aggressiveness, selfishness, etc. can be determined. However, it should be noted that none of these systems disclosed relate to the creation, evaluation and optimization of business partnerships.

Thus, nowhere in the prior is seen a system or method for creating, managing, evaluating, optimizing, creating industry standards and creating knowledge and business intelligence of a business partner relationship based upon both quantitative and qualitative criteria surveyed by both parties to the relationship.

BRIEF SUMMARY OF THE INVENTION

A system and method for determining a business partner value by creating weighted metrics used for identifying, evaluating and selecting a business partner for a company; creating a business agreement and weighted metrics for evaluating the business agreement; creating weighted metrics for ongoing management of the business partner; and managing the business partner by ongoing periodic evaluation of the weighted metrics for partner selection, agreement, and management. It is anticipated that both the company and the business partners will participate in the same evaluation on an ongoing basis; preferably once per month or once per quarter rather than the usual annual review. In one preferred embodiment of the present inventive process, the weighted metrics of partner selection, agreement, and management may be reported, charted and graphed providing for both visual evaluation and side by side comparison of the perceptions of both company and business partner for optimization of the business relationship and prediction of future performance. It further can be applied in the same manner and using the same methods to improve demand and customer support processes and accurately predict corporate performance and results.

The present invention consists of utilizing a continuous process improvement approach to generating partner value and when applied, demand value. In the present inventive process model, the method to improve partner selection, partner agreement, and partner management involves an ongoing, continuous process. This is a departure from the standard partner life cycle process flow. Increased partner value is driven by the continuous improvement and integration of these processes of selection, agreement and management because they include qualitative cultural and behavioral measurements that are gathered, calculated and combined to reflect both sides of the partnership. In the same way, Customer Support and Sales Force Automation can use the present invention's principles to calculate its own Demand Value. When all three are combined and weighted research results are added a total Demand Value can be calculated to predict future demand that includes all variables. The obvious similarities between continuous partner improvement and customer support and sales force improvement is that both sides select, agree, manage, and create value in the relationship. The present invention provides these tactical benefits to companies in the following areas:

Enabling accountability of the alliance and partner programs

Measuring the impact and results of any program, product or personnel change

Understanding the underlying motivations of partners that negatively impact results Gaining partner mindshare in order to optimize results Gaining competitive advantage in the market and with the partners Evaluating joint venture success probabilities and decrease joint venture risks Capturing accurate and precise data that assists in complying with Sarbanes-Oxley Act Creating a sophisticated knowledgebase that will provide insight into the impact of anticipated changes Reducing costs associated with new alliances and new programs In the present invention, the Partner Value calculation is generated by assigning percentage values for Partner Selection, Partner Agreement, and Partner Management where the total percentage equals 100 percent. Unlike the prior art, both business partners score the same weighted criteria, which can be weighted differently because the vendor and the vendee's points of view will be different, providing for two sets of data. The average score or result for each module is multiplied by the percentage of the Partner Value attribute for each and then the result is added together to reflect a Partner Value percent or index of between 0 and 1.000. This calculated percent equals the alliance or partner value. Unlike prior, more rudimentary systems, in one preferred embodiment of the present invention, each of the values for Partner Selection, Partner Agreement, and Partner Management are calculated on a quarterly or monthly basis and not on an annual basis. Further, Partner Value which has not been calculated previously will also be calculated.

For example, in a Partner Value Model where Partner Selection represents 15 percent of the total partner value, the Partner Agreement represents 10 percent of the total Partner Value and Partner Management represents 75 percent of the total Partner Value the total value of the relationship equals 100 percent. As the partner value increases, revenues or the objective of the relationship will increase or be reached. The Partner Value Index can then be used to predict future performance. This would be done by determining the variance of the Partner Index Value against 1.000. For example, if the Partner Value Index was 0.9255, then the variance that can be used for prediction would be +/−0.0745. This means that a future performance prediction would be within the +/−range. This is significant because until the present method there has been no previous method to accurately predict future partner performance.

In the same way, as the Partner Value Model is applied to CRM and SFA relationships, an index value representing the relationships can be calculated so that areas for improvement can be identified and demand predictions can become more accurate.

Metrics, or measurements, drive the continuous improvement process. They are captured in Partner Selection, Partner Agreement and Partner Management and then compared to the objectives and numeric values in each of the modules. Weights are assigned to each metric so that the analysis accurately reflects the state of the relationship and its total value. The weights are assigned by both parties to the relationship so that each perspective or viewpoint can be captured. The present system and method allows for each company down to each individual employee or party, to provide a weight to each metric. Improvements can then be made in the relationship in order to increase the Partner Value calculation. Examples of the metrics are found in the accompanying figures.

The same system and method can apply metrics, both quantitative that are used today and qualitative, which are not using this system and method, including behavioral and cultural metrics for CRM relationships and SFA relationships.

The metrics used to calculate Partner Value are defined based on the objectives of the partnership and expected results for the partnership. This approach can be applied to any type of partnership or alliance. The metrics are given an importance value by the partner with consideration by the initiator. The contribution value for each module is assigned through management agreement by the initiator of the partnership during or prior to the selection process. The same is true for CRM and SFA relationships.

Data is collected from each touch point of the relationship. The present system and method can identify cross-functional strengths and weaknesses in the processes for selection, agreement and management. It is unique in that it allows for the analysis of variables between selection, agreement and management. For example, it may be identified as a selection weakness as a condition/result that a partner does not reach its performance objective. Another example, it may be that a partner's performance deteriorated as a result of late payments by the vendor and it had nothing to do with market conditions or lack of resources as originally thought. Examples of additional relationships are in the accompanying figures.

Sample Partner Value Calculation 15 percent assigned value to Partner Selection 10 percent assigned value to Partner Agreement 75 percent assigned value to Partner Management Partner Selection analysis result equals 0.7841 based on weighted average of metrics.

Partner Agreement analysis result equals 0.8504 based on weighted average of metrics.

Partner Management analysis result equals 0.9029 based on weighted average of metrics.

From this, the example Partner Value for the partnership may be calculated as follows:

| Partner Value Index Summary Report | Index | No. of Calculations | No. of Groups | No. of Categories | No. of Criteria |
|---|---|---|---|---|---|
| Partner Value Index | 0.8799 | 921 | 8 | 33 | 220 |
| Partner Selection Index | 0.7841 | 298 | 6 | 11 | 86 |
| Partner Agreement Index | 0.8504 | 190 | 1 | 7 | 35 |
| Partner Management Index | 0.9029 | 433 | 1 | 15 | 99 |

The resulting Partner leaves for an almost twelve percent (12 percent) improvement in overall performance.

To ensure accuracy of data in reflecting all aspects of the partnership in addition to weighting the measurements from different points of view, the present system or method can calculate the indexes for an unlimited number of inputs. The greater the number of inputs, the more accurate the calculated data results.

If the Vendor and Partner each had 20 respondents, the number of calculations, at minimum, would be as follows:

| | Quarterly | Annually | 5 Years |
|---|---|---|---|
| Partner Value Index | 36840 | 147360 | 736800 |
| Partner Selection Index | 11920 | 47680 | 238400 |
| Partner Agreement Index | 7600 | 30400 | 152000 |
| Partner Management Index | 17320 | 69280 | 346400 |

Using the above example and adding that the Vendor had twenty Partners, the number of calculations would approximate the following:

| | Quarterly | Annually | 5 Years |
|---|---|---|---|
| Partner Value Index | 73680 | 294720 | 1473600 |
| Partner Selection Index | 23840 | 95360 | 476800 |
| Partner Agreement Index | 15200 | 60800 | 304000 |
| Partner Management Index | 346400 | 138560 | 692800 |

As the volume of transaction calculations increases, the data will become more accurate and more precise. This will allow companies to predict performance, results and areas and processes that can impact them. This information over time creates standard information regarding the partnerships of the company and when combined with the information of other companies, it creates industry standard information.

As the volume of information increases over time it also creates knowledge regarding partnerships, but will also provide information regarding future performance and the selection, agreement and management of future partners. The same holds true with CRM Relationships and SFA Relationships. Customer company personnel leave their company for better opportunities or to retire and the present system will allow for the capture of not only quantitative account information but also qualitative information including insights into the customer's company culture and behavior.

In the above example, the partner achieved 95 percent of the revenue expectation and yet, the Partner Value index is only 0.8799. This means that the partnership is 12 percent short of optimized—meaning, if the appropriate improvements are made to the partnership, the revenue or expectation number could increase to over 100 percent. In hard dollars, if the expected plan was $20 million, revenues could increase by over $1 million.

The model is a significant invention because it is the first system and method that can be applied to analyze and optimize most any alliance or business partnership between two business entities. It was determined through our research and collective experience that there are both direct and indirect issues and conditions that can impact the effective creation and performance of an alliance, channel or other business partnerships. There has been no effective process that accurately and precisely measures and calculates a value for all information that identifies these issues and conditions. There also has been no method of collecting reusable alliance and business partnership knowledge or business intelligence data for alliances and business partnerships. The drill downs identify every area where improvement is needed or the relationship is at risk of non-performance. The impact of any change in personnel, policy, program, or process can be accurately measured. As the database of information grows over time, knowledge of all that has been added, changed or tried will be generated so as current management leaves and/or retires, their knowledge will remain. The same holds true for relationships that are created and measured for CRM or SFA. The present system and method can allow for an infinite number of calculations for a given company to company relationship. For index values that are outside of business partnerships, alliances and channels, the index value is called the Demand Value Index.

Each component also has its own health and optimization opportunity calculations. The component calculation reflects the measurement of the aggregate quantitative and qualitative criteria inputs from both the vendor and partner. As identified areas are continuously improved, partner optimization will take place causing an increase in performance and results.

Quantitative criteria calculations reflect a partnership's measurement against performance. Qualitative calculations reflect the measurements of criteria that impact partner performance. Qualitative measurements are key to understanding the relationship side of the partnership. It is especially important in highly competitive markets where products and commissions are becoming more uniform. Partners are increasingly seeking things that make life easier and better relationships with their vendors. Partners have a choice of vendors that they represent. This is more true for customers.

Additional information provided by the present system is summary data regarding the partnership. In the below examples, index calculations have been generated for the labeled aspects. Some of the attached reports provide comparisons between vendor and vendee that demonstrate the differences in perceptions when the parties of the partnership are asked the same questions. Further, the weights of the variables to be measured as to their priority and importance can increase or decrease the variance between the responses. The present system is unique in its ability to provide detailed information regarding these variances. For the first time, vendors will be able to understand how different components of the partnership impact the results of the partnership. Seemingly disparate variables can be measured and compared against and across selection, agreement, and management of the partnership where each calculation will have an impact on the optimization of the partnership.

| Index Partner Summary Report | Partner Value Index | Partner Selection Index | Partner Agreement Index | Partner Management Index | Partner Quota Achievement |
|---|---|---|---|---|---|
| System Integrators | 0.8522 | 0.9412 | 0.8243 | 0.8452 | 0.8872 |
| Independent Software Vendors | 0.8947 | 0.8881 | 0.8765 | 0.8223 | 0.9124 |
| Channel Resellers | 0.8669 | 0.8259 | 0.8455 | 0.8433 | 0.8616 |
| Referral Partners | 0.7507 | 0.7878 | 0.8101 | 0.8122 | 0.7443 |

FIG. 24 shows report showing the comparison of the vendor perception compared to the partner perception over multiple periods.

Additional detailed reports of the present invention are in the figures including detailed input and findings information.

Thus, it is one primary object of the present invention to provide a continuous business partner generation, evaluation, optimization, industry standard creation, and knowledge and business intelligence creation system which utilizes a set of metrics in order to create a Partner Selection value.

It is yet an additional primary object of the present invention to provide a continuous business partner evaluation, optimization, industry standard creation, and knowledge and business intelligence creation system which utilizes a set of metrics in order to create a Partner Management value.

A further primary object of the present invention is to provide a continuous business partner evaluation, optimization, industry standard creation, and knowledge and business intelligence creation system which utilizes a set of metrics in order to create a Partner Agreement value.

Still an additional primary object of the present invention is to provide a continuous business partner evaluation, optimization, industry standard creation and knowledge and business intelligence creation system which utilizes a weighted Partner Selection, Partner Agreement and Partner Management values which may be weighted in order to create an overall Partner Value rating which provides a variance gap calculation between a fully optimized business partnership and the state of the current partnership.

Yet a further primary object of the present invention is to provide a continuous business partner evaluation, optimization, industry standard creation and knowledge and business intelligence creation system which utilizes a comprehensive set of metrics for each of the Partner Selection, Partner Management and Partner Agreement and Partner Value ratings, each of which are evaluated on a quarterly or more often basis, and not only on an annual basis.

Still a further primary object of the present invention is to provide a continuous business partner evaluation, optimization, industry standard creation and knowledge and business intelligence creation system which may chart or graph by computer each of the Partner Selection, Partner Management and Partner Agreement and Partner Value ratings over a period of time for the purposes of allowing the business partners to optimize their relationship.

Yet an additional primary object of the present invention is to provide a continuous business partner evaluation, optimization, industry standard creation and knowledge and business intelligence creation system which evaluates, charts and graphs data for each of Partner Selection, Partner Management and Partner Agreement and Partner Value ratings, by both parties to the relationship, and not just the customer or vendee.

Still a further primary object of the present invention is to provide a continuous business partner evaluation, optimization, industry standard creation, and knowledge and business intelligence creation system which can be used in the same method to calculate a same value for the partnership value between a company support organization and its customers. The only difference between collecting and calculating such data for this CRM relationship is the label which is called CRM Value Index.

Yet an additional primary object of the present invention is to provide a continuous business partner evaluation, optimization, industry standard creation, and knowledge and business intelligence creation system which can be used in the same method to calculate a same value for the partnership value between a company sales organization and its customers. The only difference between collecting and calculating such data for this SFA relationship is the label which is called SFA Value Index.

Still a further additional primary object of the present invention is to provide a continuous business partner evaluation, optimization, industry standard creation, and knowledge and business intelligence creation system which can be used in the same method to calculate a same value for the partnership value between a company sales organization and its customers. The only difference between collecting and calculating such data for this SFA relationship is the label which is called SFA Value Index.

Yet an additional primary object of the present invention is to provide a continuous business partner evaluation, optimization, industry standard creation, and knowledge and business intelligence creation system which can create industry standards when the collected data results from the companies within an industry are combined and averaged to present average industry partnership results.

Further as a primary object of the present invention to provide a continuous business partner evaluation, optimization, industry standard creation, and knowledge and business intelligence creation system which creates re-useable knowledge and business intelligence data that becomes increasingly more accurate over time as more and more additional information is collected and processed.

Still as a primary object of the present invention to provide a continuous business partner evaluation, optimization, industry standard creation and knowledge and business intelligence creation system which evaluates, charts and graphs data for each of Partner Selection, Partner Management and Partner Agreement and Partner Value ratings, by both parties to the relationship, and not just the customer or vendee.

In a specific implementation, a process for determining business partner value includes implementing the steps of providing a company, creating metrics for selection for a business partner for the company, evaluating potential business partners based on the business partner metrics, selecting a business partner based at least in part on the metrics for creating a business agreement, creating a business agreement, creating metrics for the business agreement, creating metrics for managing the business partner, and managing the business partner by an ongoing periodic evaluation of the metrics for the partner selection, partner agreement and partner management.

The metrics for partner selection may be a weighted value. The metrics for partner agreement may be a weighted value. The metrics for partner management may be a weighted value. The metrics for partner selection, partner agreement, and partner management may add up to one hundred percent.

The business partner value may be determined by the company on at least a quarterly basis. The business partner value may be determined on at least a monthly basis. The business partner value may be determined by both company and business partner at least on a quarterly basis. The business partner value may be determined by both company and business partner at least on a monthly basis. The business partner value may be determined by both company and business partner on at least a quarterly basis and may be plotted on a graph for evaluation purposes. At least one of the metrics for partner selection may be plotted an a graph on at least a quarterly basis for evaluation purposes.

At least one of the metrics for partner agreement may be plotted on a graph on at least a quarterly basis for evaluation purposes. At least one of the metrics for partner management may be plotted on a graph on at least a quarterly basis for evaluation purposes. In an implementation, both the metrics for partner selection by company and by the business partner are plotted together for evaluation purposes. Both the metrics for partner selection by both company and by the business partner may be plotted together for evaluation purposes. Both the metrics for partner management by both company and the business partner may be plotted together for evaluation purposes.

In a specific implementation, a system for determining a business partner value includes a system module for determining a partner selection value, a system module for determining a partner agreement value, a system module for determining a partner management value; and a system module for determining a partner value.

The partner selection system module may further include means for selecting metrics for partner selection criteria. The partner management module may further include means for selecting metrics for partner management criteria. The partner agreement module may further include means for selecting metrics for partner agreement criteria. The partner value module may further include means for calculating a partner value based upon the values provided by the systems modules for the partner selection, partner management and partner agreement.

These and other objects and advantages of the present invention can be readily derived from the following detailed description of the attachments and drawings taken in conjunction with the accompanying drawings present herein and should be considered as within the overall scope of the invention.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 5 shows a table of a totals page for a New Invention Data Calculator Process

FIGS. 7A-7B show a detail table of a Strategic Fit group for Partner Selection.

FIG. 8 shows a detail table of a Strategic Fit for Partner Resources.

FIG. 9 shows a detail table of a Strategic Fit for Quantitative Criteria.

FIG. 12 shows a detail table of Geographic Coverage.

FIGS. 13A-13B shows a total and detail table for Vendor Input and Partner Total of Partner Agreement.

FIGS. 16A-16C shows totals for Vendor/Partner Results for Partner Management.

FIGS. 17A-17B shows a detail table for Vendor Input for Partner Management.

FIGS. 18A-18B shows a detail table for Vendor/Partner Input for Partner Management.

FIG. 19A-19B shows a detail table for Partner Input for Partner Management.

FIGS. 20A-20B shows a detail table for attachment of a new invention showing its ability to analyze cross functional and cross index results.

FIGS. 21A-21B shows a detail table for Partner Selection across impact detail.

FIGS. 22A-22B shows a detail table for Partner Agreement cross impact detail.

FIGS. 23A-23B shows a detail table for Partner Management cross functional impact against selection and agreement.

DETAILED DESCRIPTION OF THE INVENTION

Figure 1:
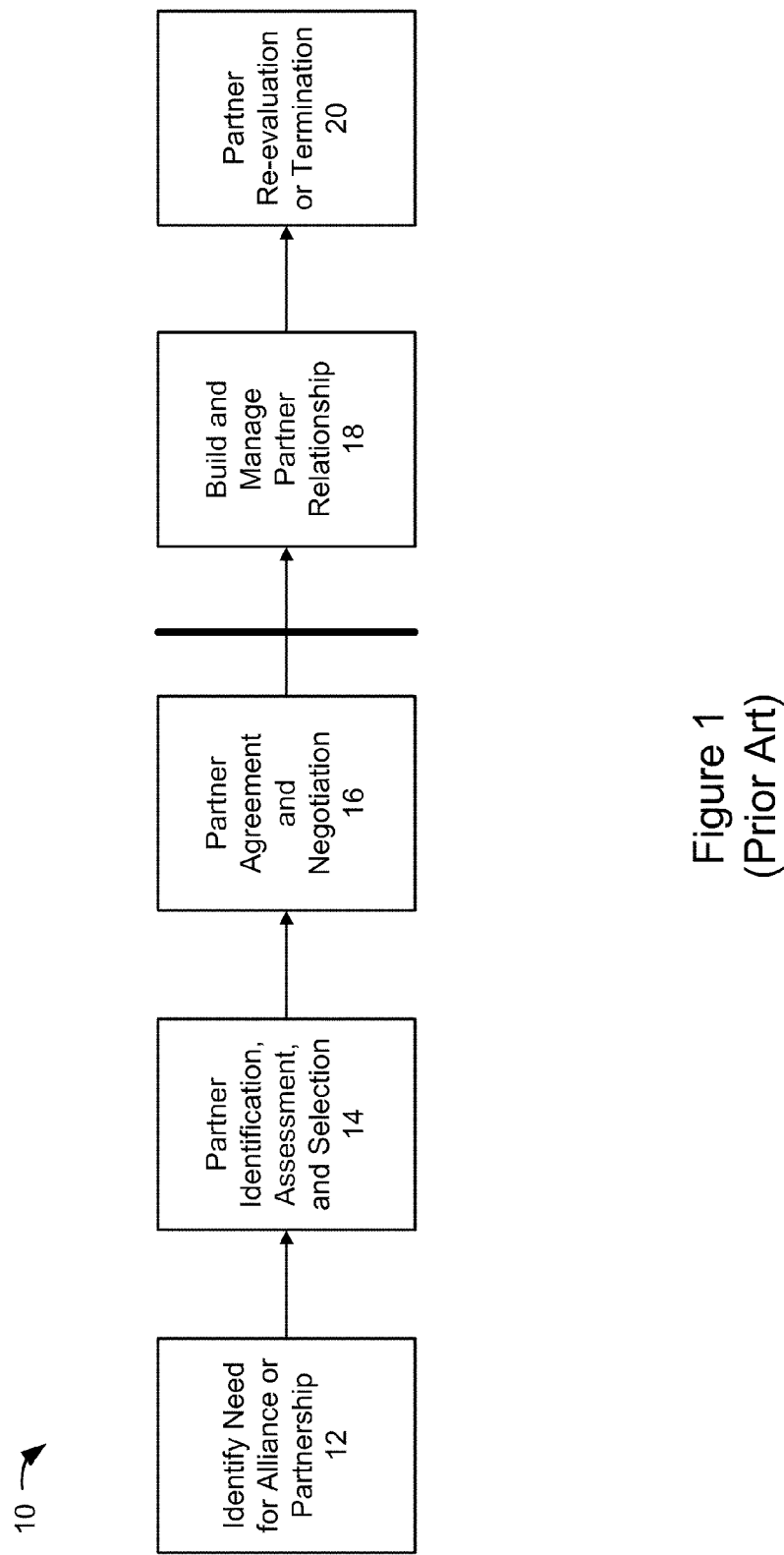
FIG. 1 is a flow chart of a typical business partner relationship (prior art).

Shown in FIG. 1 is a simple, standard flow chart 10 which illustrates a typical partnership evaluation process at various process stages. A company will identify that it has a need for a partner or alliance in a step 12. The company will typically loosely define these parameters. A number of possible partners will be identified, evaluated or assessed, and selected for the possibility of forming a partnership in a step 14. One or more possible partners will be approached for the purpose of forming a partnership and negotiations will begin with regard to pricing and terms in a step 16. Step 16 will typically result in a partner being selected and the negotiated terms being reduced into a written contract. Once a partnership has been formed, a company will typically loosely manage that partnership with infrequent evaluations over a period of time, and reviews will typically occur on an annual basis in a step 18. If it appears that the partner selected is of limited value, or the need for such a partnership no longer exists, then the partnership will terminate, typically on terms predefined in a written agreement in a step 20. Although this process is very simple and often proceeds in a somewhat unorganized fashion, it has been the typical role model for many companies in the past.

Figure 2:
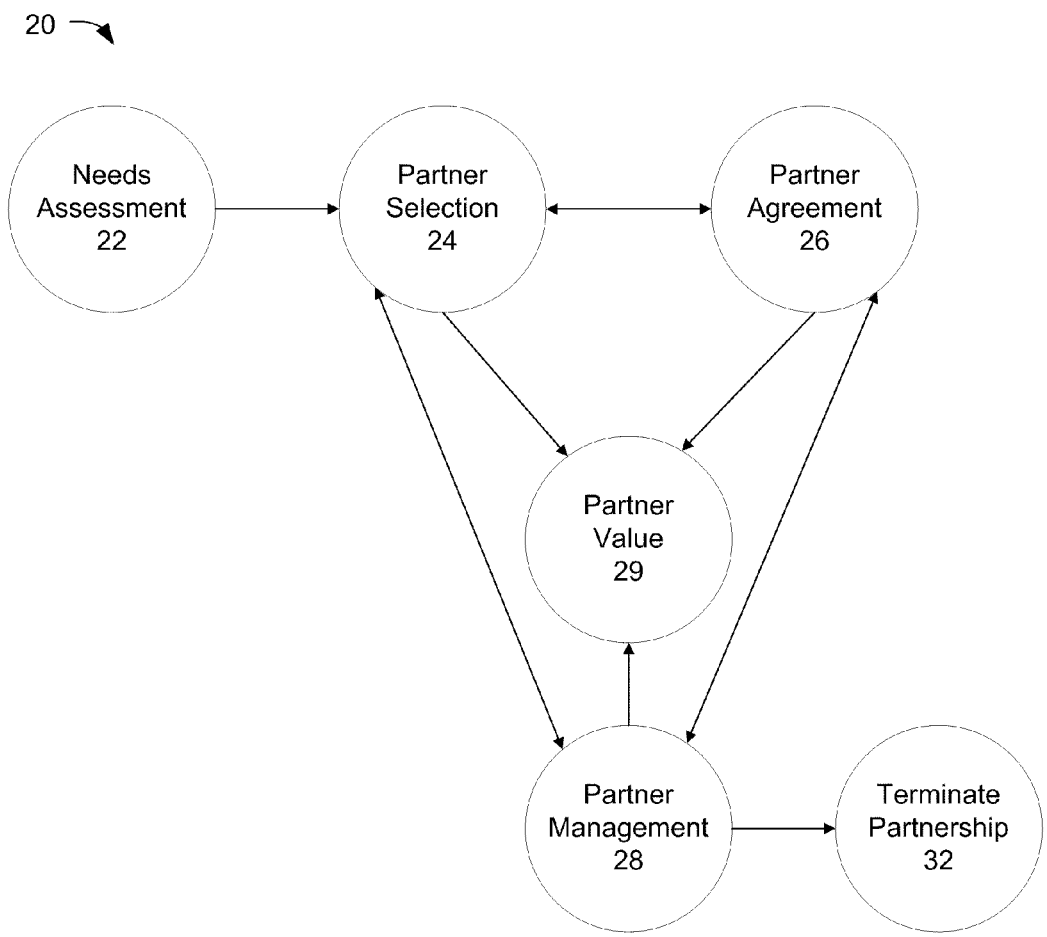
FIG. 2 is a flow chart of the present invention showing a system wherein partner Selection, Partner Agreement and Partner Management values create a total Partner Value for overall assessment of a partner relationship.

Shown in FIG. 2 is a flow chart of an implementation of the present invention. In a partner value model 20, a comprehensive needs assessment 22 is initiated by the company, then a partner selection 24 process occurs, and when this process is complete, a partner management 28 can become linked both to a partner agreement criteria 26 and partner selection criteria 24, so that a resulting overall partner value 29 becomes a regular assessment of all of these criteria. When there is no further need for the partnership or partner value 29 becomes too deficient to the company, then the partner relationship is terminated by company 32. In any case, since partner selection 24 is continually monitored in conjunction with partner agreement 26 and the partner management criteria of 28, this allows for the optimization of partner value model 20.

Figure 3A:
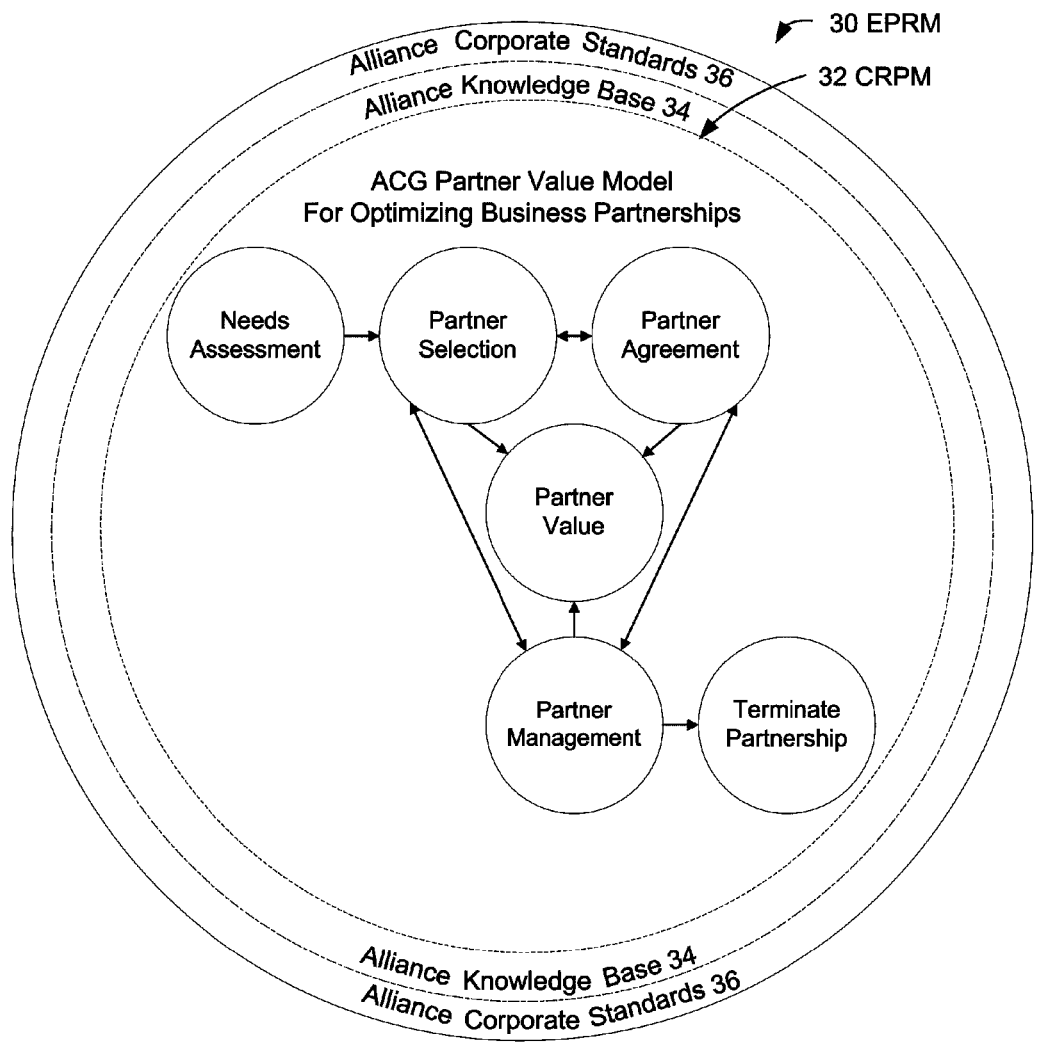
FIG. 3A is a diagram with a central flow chart from FIG. 2 which shows the proper interrelation with Alliance Knowledge Base and Alliance (Industry) Corporate Standards.

Shown in FIG. 3A is an Enhanced Core Partner Value Model 30 which consists of a Core Partner Value Model 32 whose results generate an Alliance Knowledge Base 34 through the Core Partner Value Model's 32 use over time. The Alliance Knowledge Base 34, when combined with the Alliance Knowledge Base's of other companies in the some industry and is averaged, creates an Alliance and Industry-Corporate Standards 36 database.

Figure 3B:
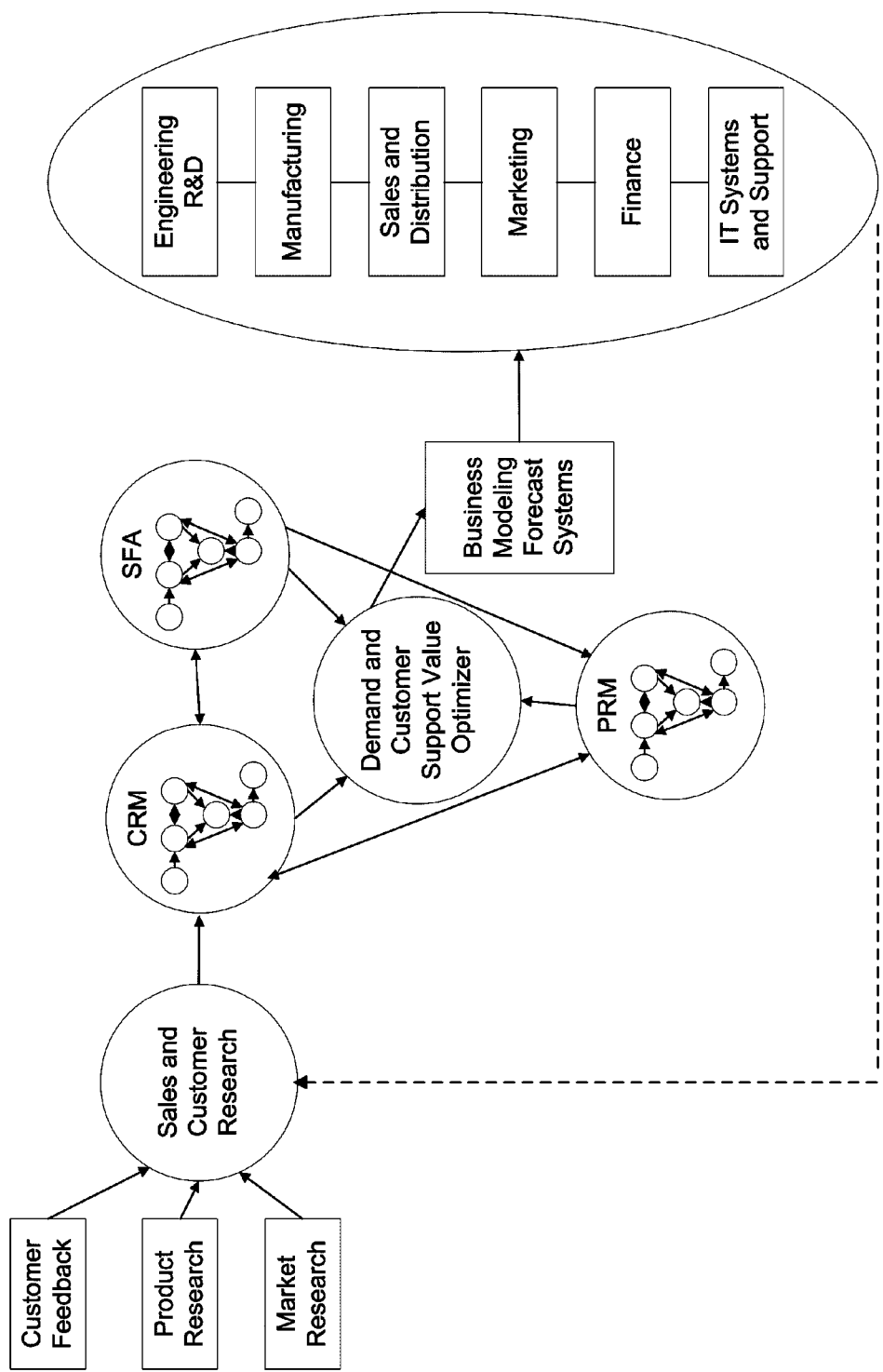
FIG. 3B shows a diagram with a flow chart in the center of the diagram showing interrelationships with a second flow chart that predicts corporate requirements and results in a continuous closed loop. Also on this diagram is an outside flowchart of research and market information.

FIG. 3B shows a diagram with a flow chart in the center of the diagram showing interrelationships with a second flow chart that predicts corporate requirements and results in a continuous closed loop. Also on this diagram is an outside flowchart of research and market information.

Figure 4:
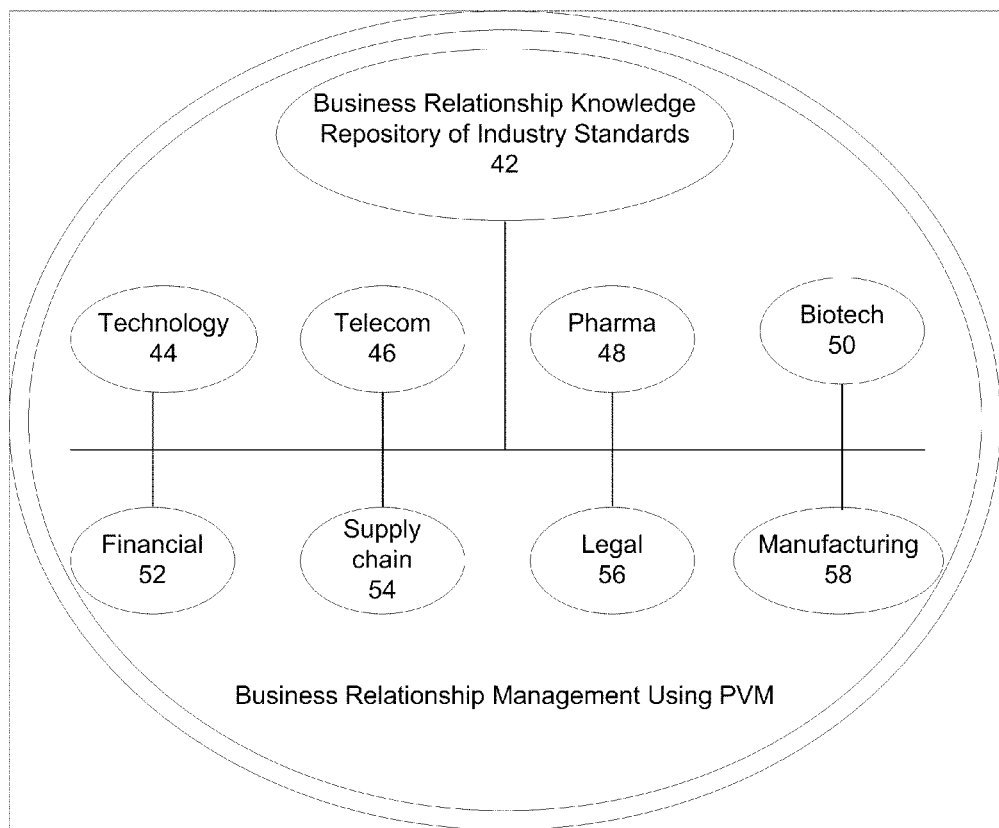
FIG. 4 shows a collection of combined industry knowledge from industries so that alliance information may be utilized across industries through a single business repository of knowledge.

FIG. 4 shows a collection of combined industry knowledge from industries so that alliance information may be utilized across industries through a single business repository of knowledge. A Business knowledge base 42 applies to all industries and is linked directly to individual industries, including but not limited to: technology 44, telecom 46, pharmacology 48, biotech 50, financial services 52, supply chain businesses 54, legal services 56 and manufacturing 58. The central repository allows all industries worldwide to share and utilize alliance and partnership best practices and knowledge.

FIG. 5 shows a roll up summary table showing index value totals for Partner Value, Partner Selection, Partner Agreement, and Partner Management indicating a weighted category value against Partner Value. It further totals Partner Selection weighted category totals, Partner Agreement weighted category totals, and Partner Management weighted category totals.

Figure 6:
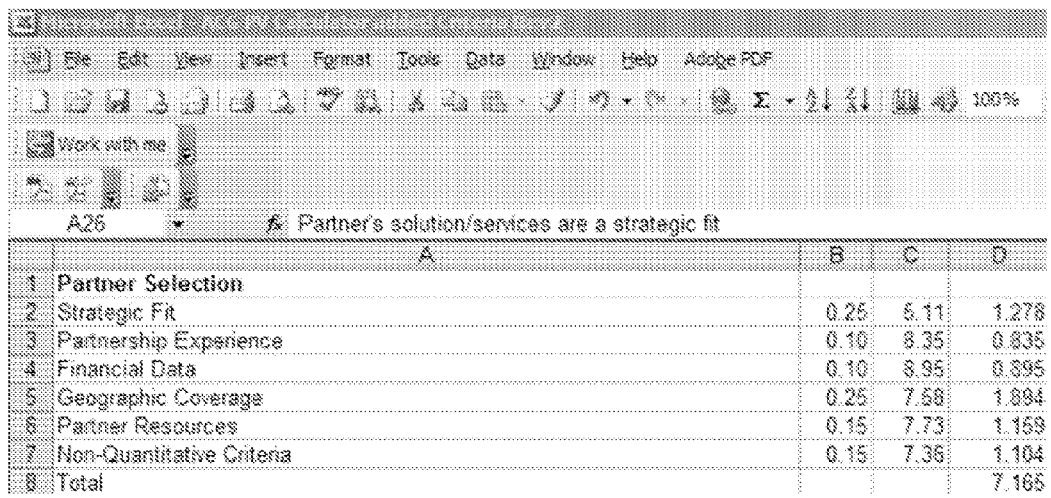
FIG. 6 shows a table of a totals page for Partner Selection.

FIG. 6 shows Partner Selection weighted category totals. Various categories can be used to determine whether or not a partner should be selected. In this example, strategic fit, partnership experience, financial data, geographic coverage, partner resources, and nonquantitative criteria are used. FIG. 6 further shows a strategic fit criteria table 60 which is used to monitor the potential alliance partner's strategic fit by the company utilizing the present invention to identify, assess, and select an alliance partner. Strategic Fit criteria may include, but is not limited to, the partner against company short and long term goals and objectives; the partner's potential for assisting the company in maximizing sales revenue, reducing sales expenses, increasing profitability, and optimizing sales cycle. Each of these items may have sub-items all of which are weighted, as are the items.

Figure 7A:
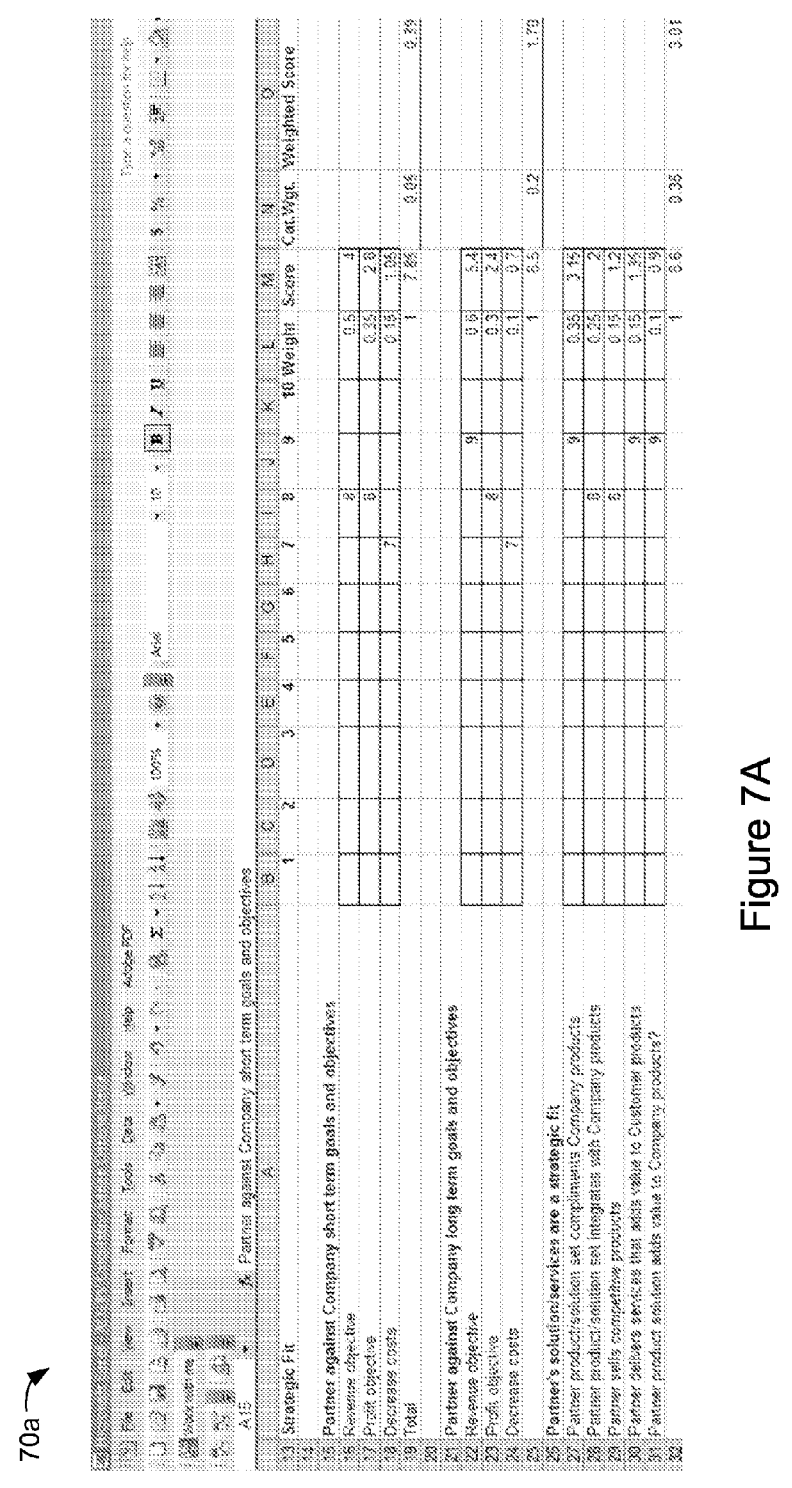
Figure 7B:
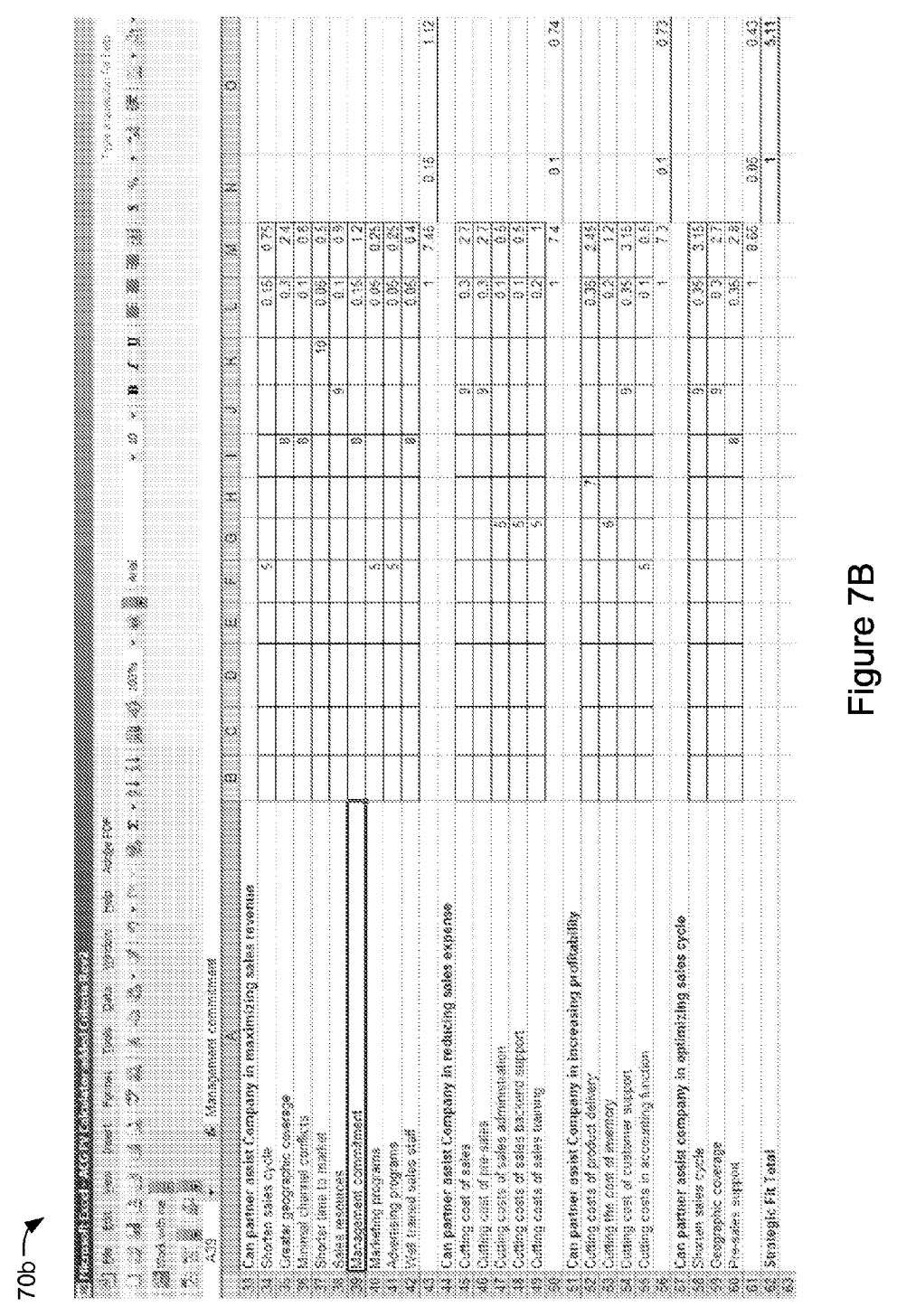

FIGS. 7A-7B show Partner Selection, Strategic Fit category detail and weighted totals. FIGS. 7A and 7B show a partnership experience criteria table 70a and 70b which is used to determine the potential alliance partner's partnership experience by the company utilizing the present invention to identify, assess, and select an alliance partner. Partnership experience may include, but is not limited to, industrial, product, and channel experience; minimal channel conflict; meets or met revenue and profit targets for vendor(s); and with customer and prospect base. Each of these items is also weighted.

Figure 8:
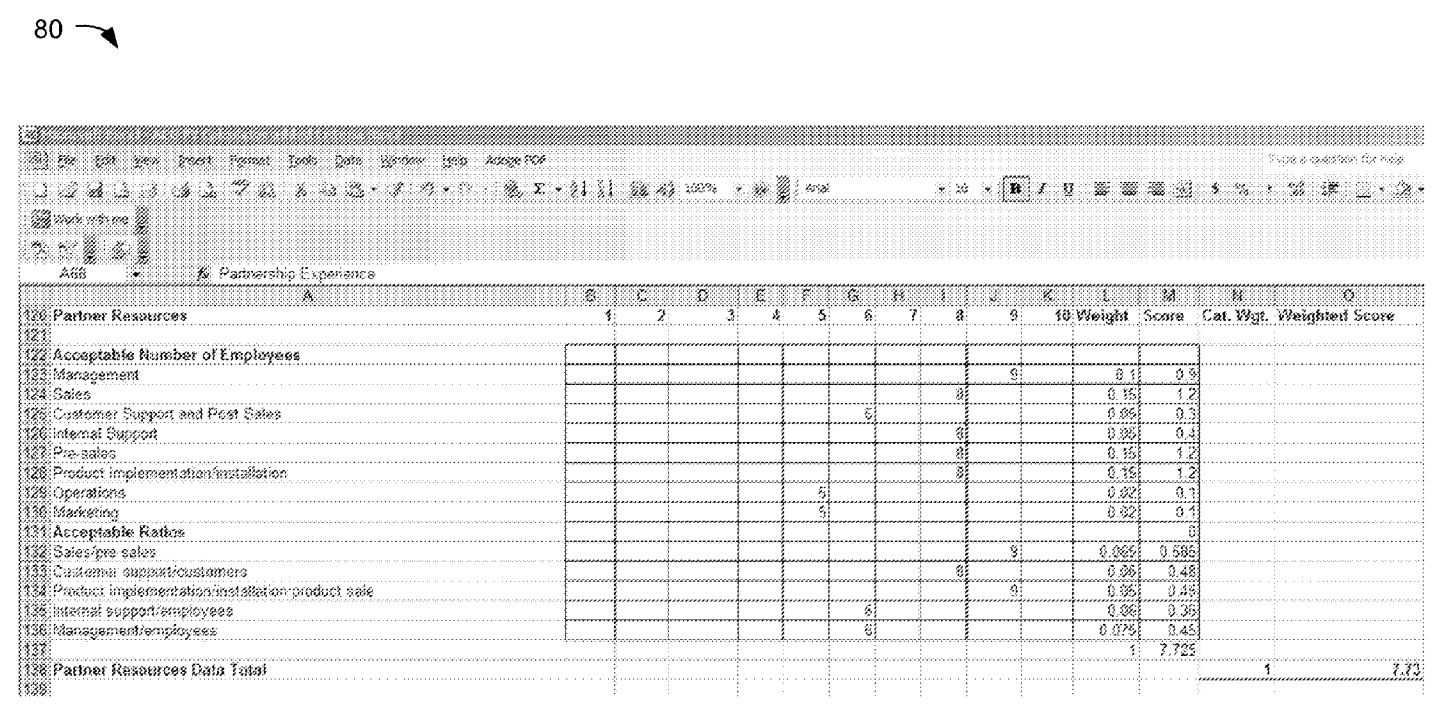

FIG. 8 shows Partner Selection, Partner Resources weighted category details and totals. FIG. 8 shows a quantitative metrics score sheet 80 which is used to evaluate quantitative facts and figures regarding a company's vendors and business partners, including, but not limited to: increase in new partners, new partner effectiveness, sales revenues versus planned revenues, partner sales increase, actual versus forecast sales, forecast accuracy, sales by customers, both new and existing, sale accuracies, partner payments, lead follow through of contacts, report partner, prospects with and without leads, sales with and without leads or through the marketing program, marketing program costs forecast and actual, conflict data including number of conflicts, reported, resolved and outstanding; partner costs, including support, customer costs, pre-sales costs, costs by manager by sales, administration costs, inventory reduction savings and business plan accuracy ratings.

Figure 9:
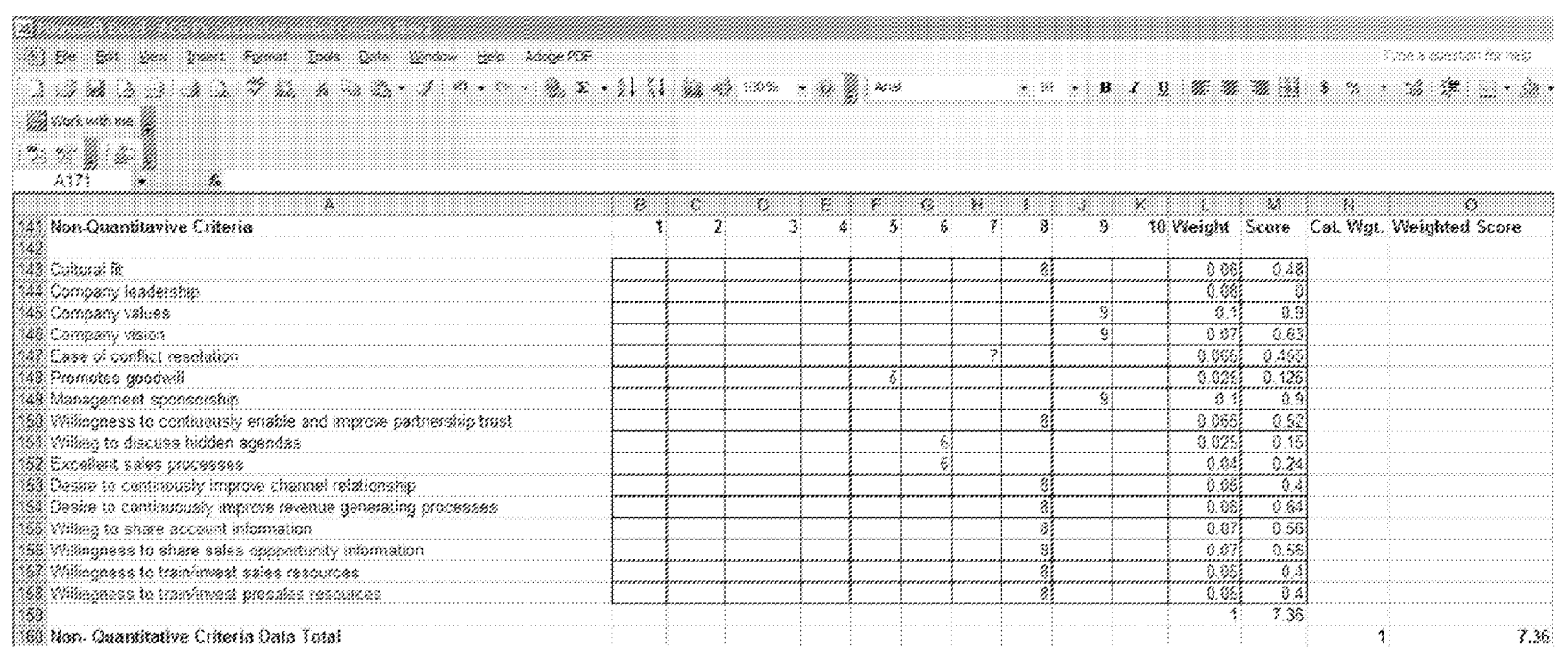

FIG. 9 shows Partner Selection, Partner nonquantitative category weighted details and totals. Criteria in this instance which were reported were: channel account manager effectiveness, team effectiveness, quantity of disputes, satisfaction of dispute resolutions, quantity and quality of leads. The percentage gap in perception between vendor and partner or company is also shown. In this respect, the vendor is readily attuned to areas where the gap in perception in the greatest and the vendor may direct its attention to remedying deficiencies perceived by the vendee or company. Also, whether and how much any improvement is needed is given in an easy to understand format. It is only when there is no gap and the perceptions are either correctly aligned or very closely aligned that the business partner relationship is most capable of improving. With a very quick understanding, the vendor may readily determine where it must spend the most time and resources in creating the most improvement in the relationship, and where time and resources may be wasted because the company or vendee is already well satisfied with the vendor's performance.

Figure 10:
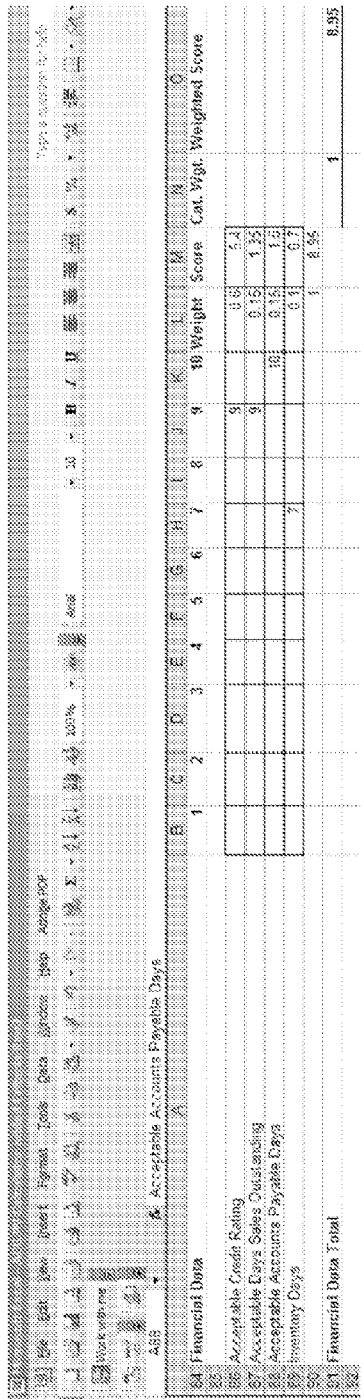
FIG. 10 shows a detail table of Financial Data.

FIG. 10 shows Partner Selection, Partner financial data category weighted details and totals.

Figure 11:
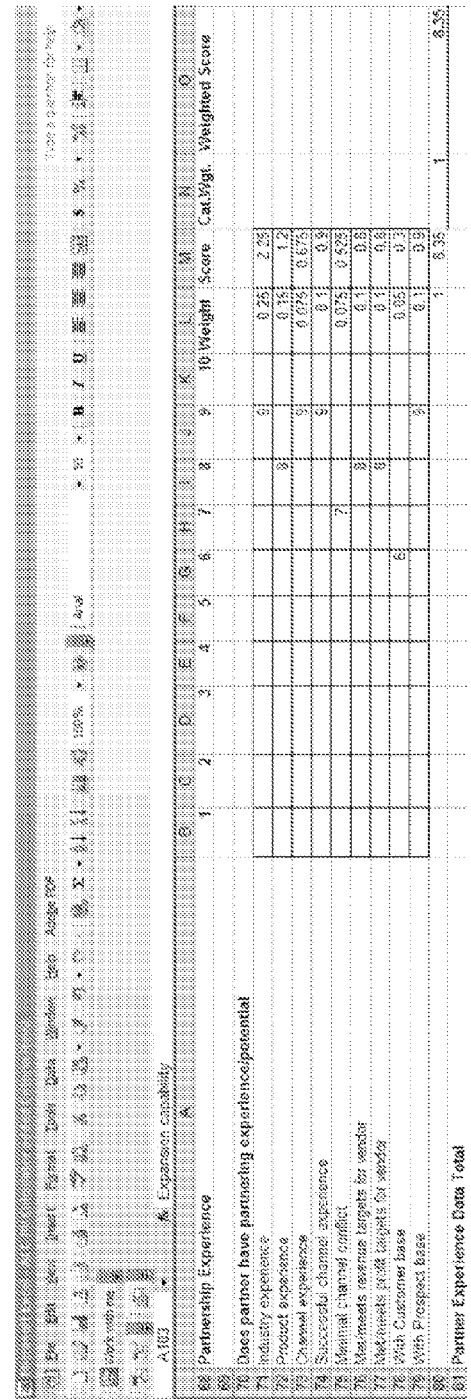
FIG. 11 shows a detail table of Partnership Experience.

FIG. 11 shows Partner, Selection, Partnership Experience data category weighted details and totals.

Figure 12:
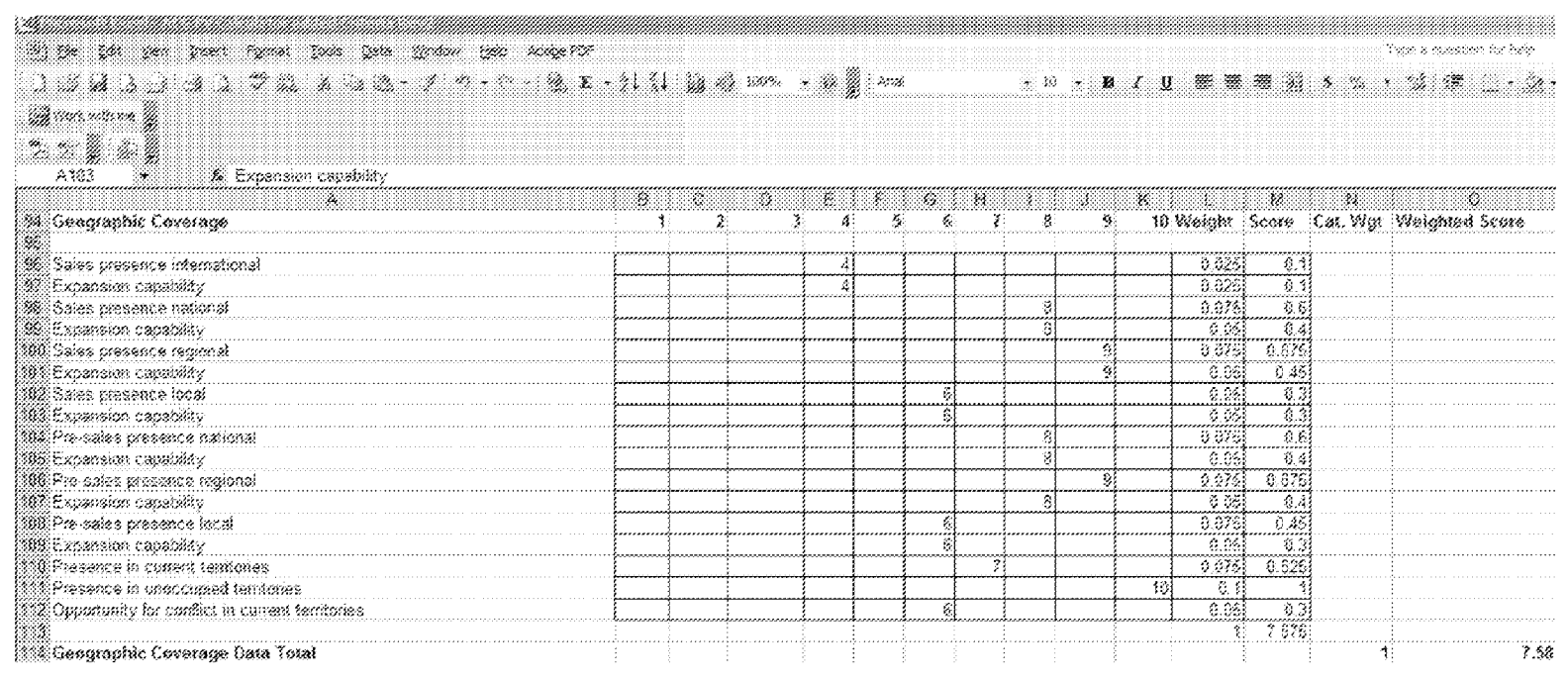

FIG. 12 shows Partner Selection, Geographic Coverage data category weighted details and totals.

Figure 13A:
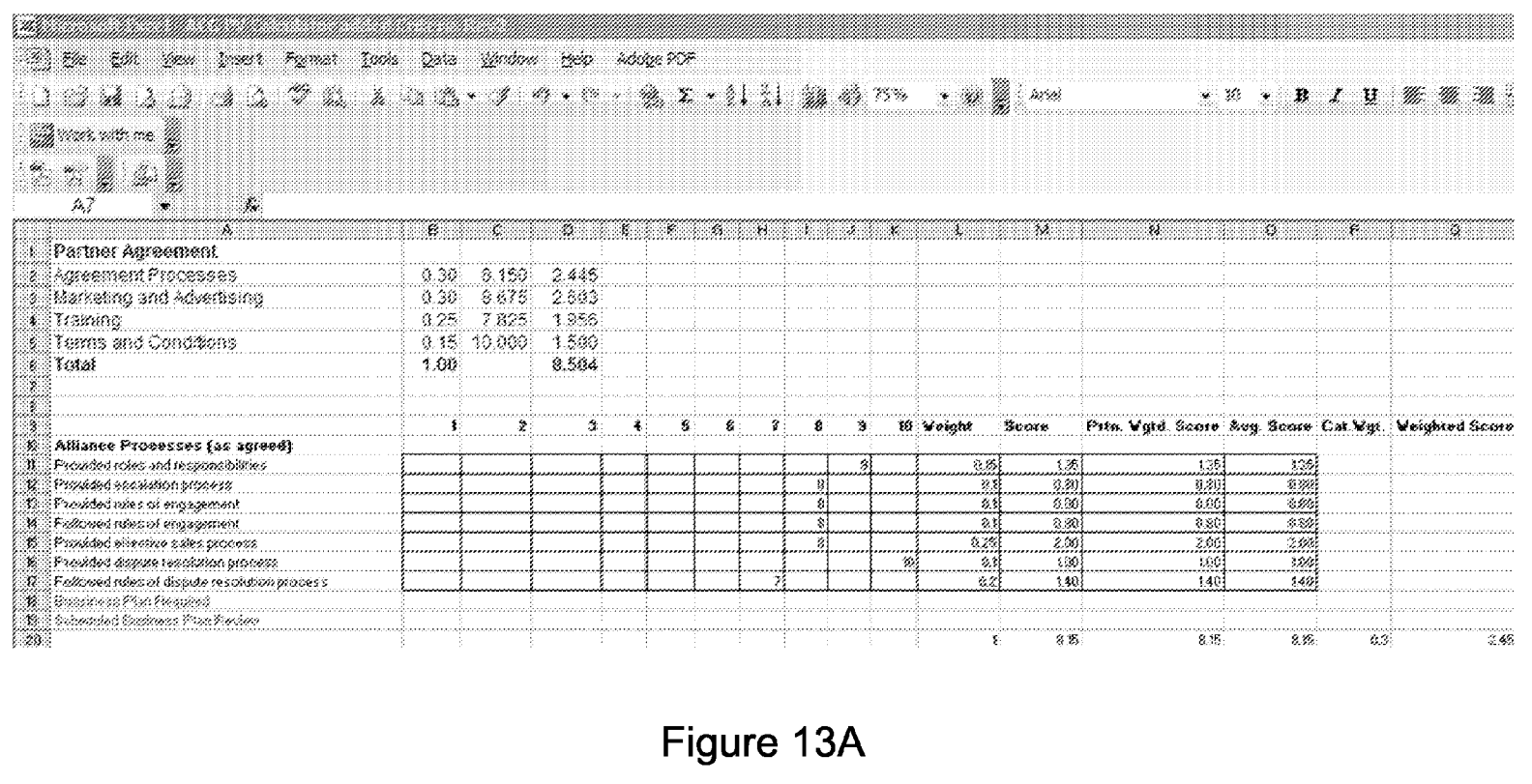
Figure 13B:
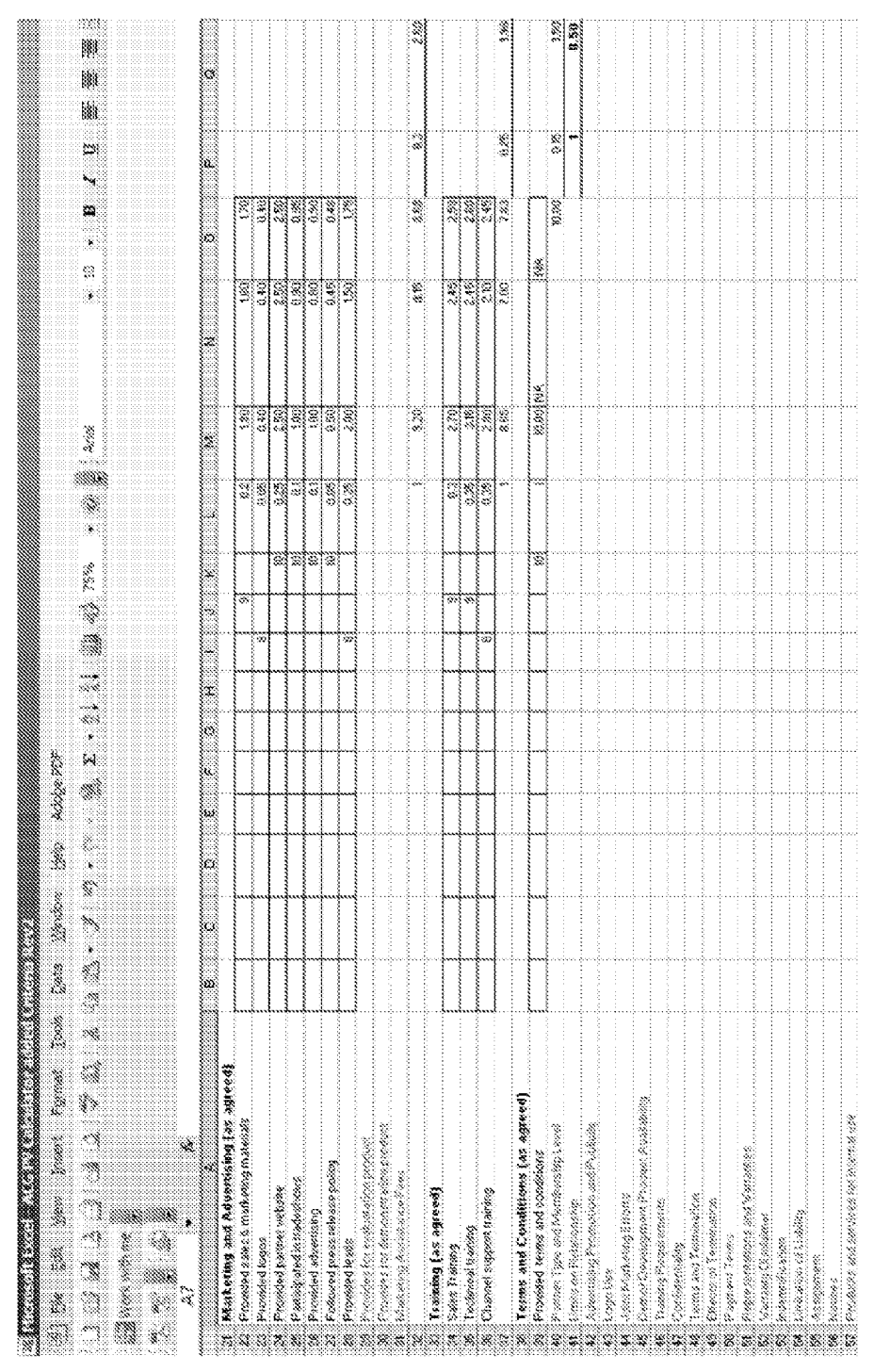

FIGS. 13A-13B is a table that shows Partner Agreement category totals and Partner Agreement, vendor input detail, totals, partner weighted score and totals and additional items to be considered for additional consideration.

Figure 14:
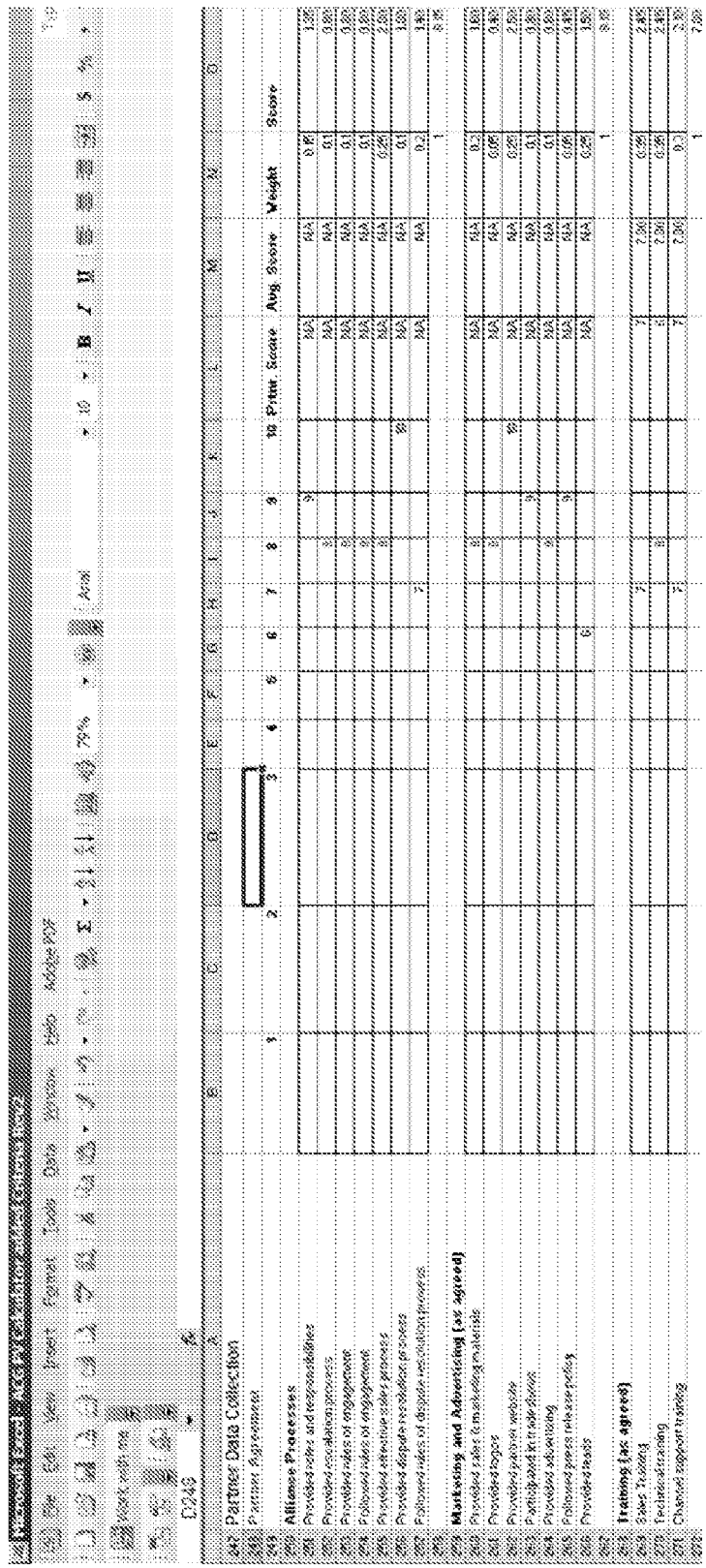
FIG. 14 shows a detail table for Partner Input for Partner Agreement.

FIG. 14 shows Partner Agreement, Partner Input details and totals.

Figure 15:
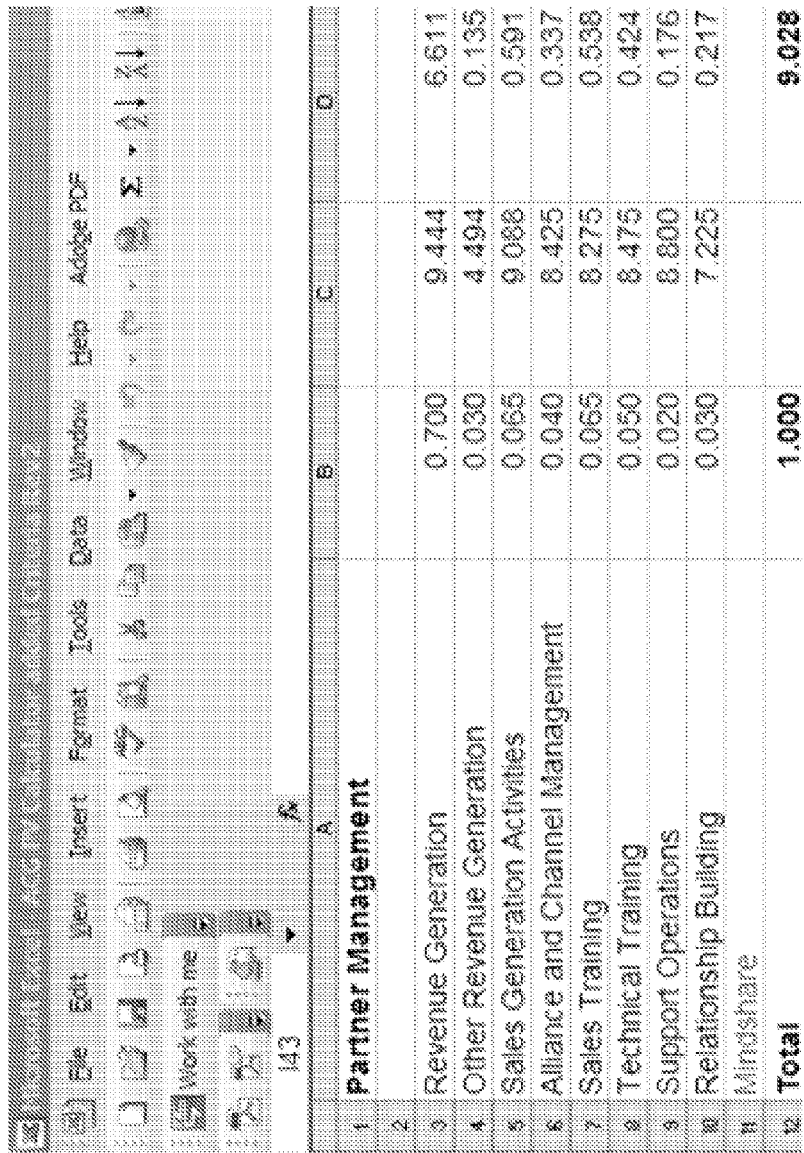
FIG. 15 shows a totals page for Partner Management.

FIG. 15 shows Partner Management Category totals.

Figure 16A:
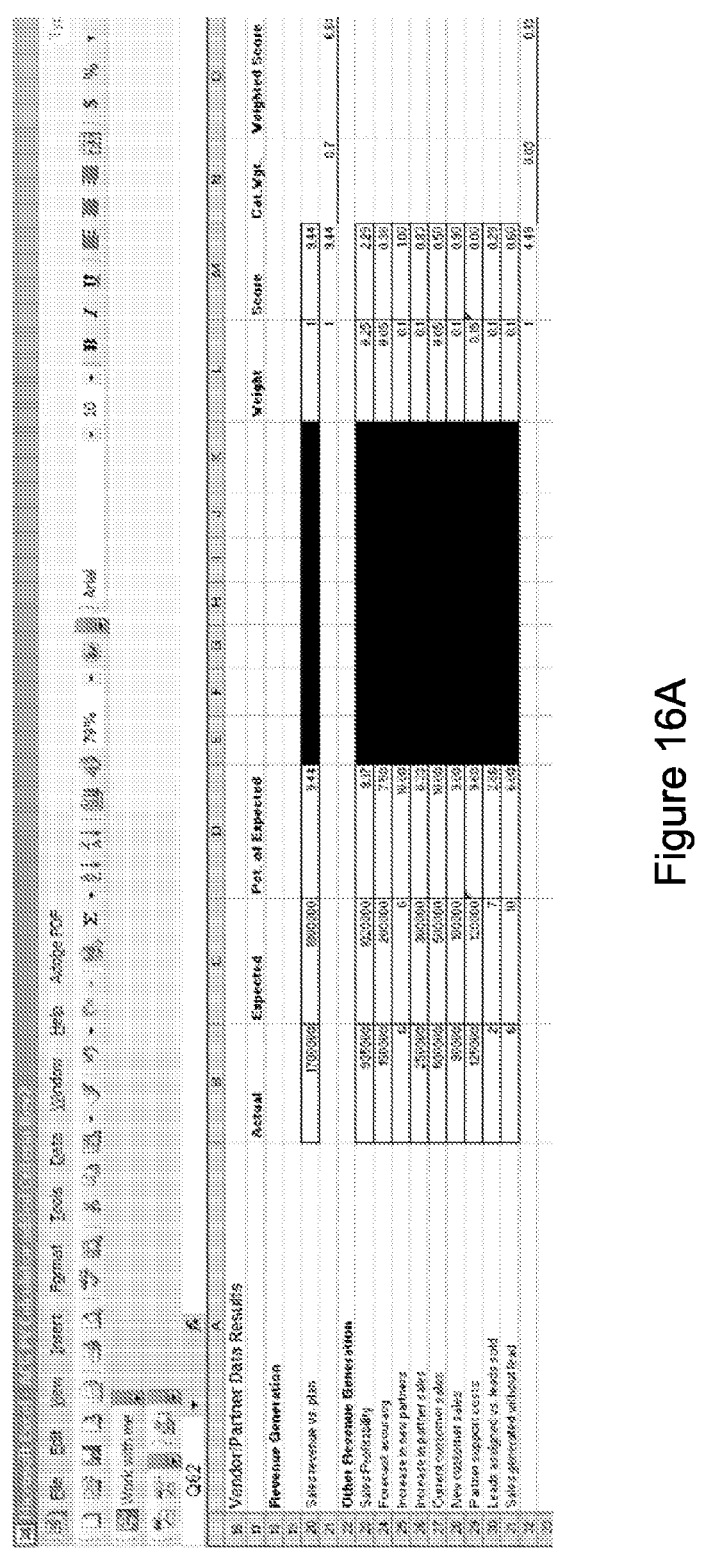
Figure 16B:
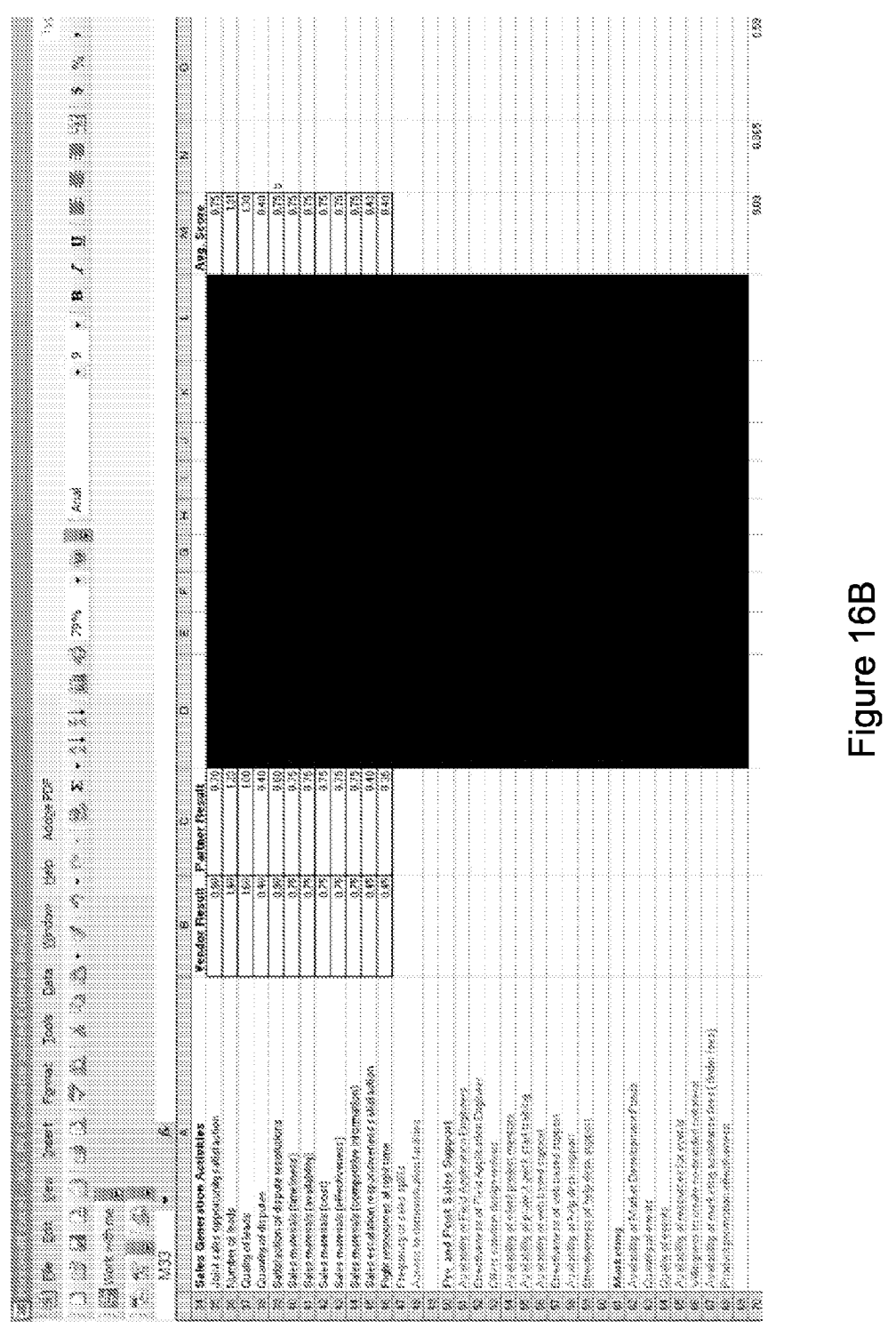
Figure 16C:
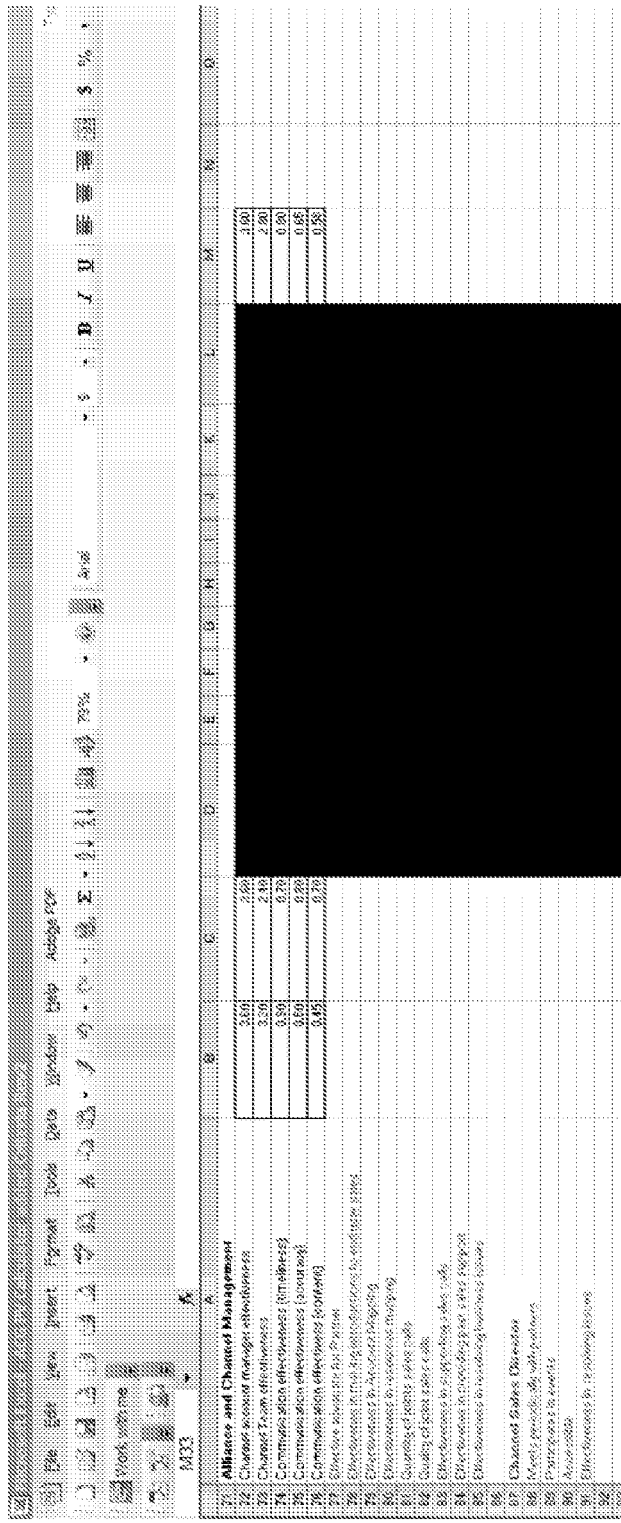

FIGS. 16A-16C shows a table of Partner Management that shows vendor/partner data totals results against expected and additional criteria to be considered for addition.

Figure 17A:
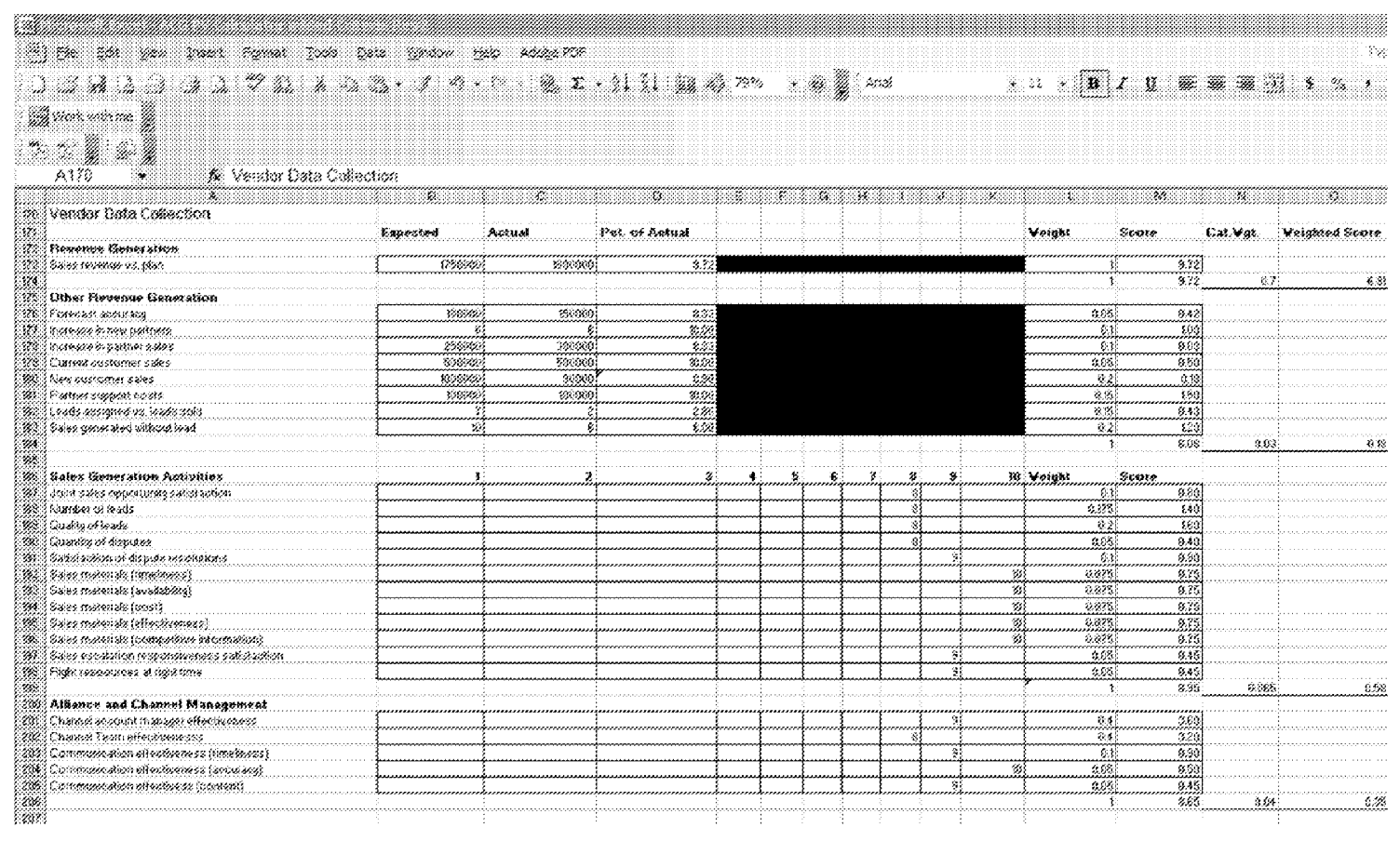
Figure 17B:
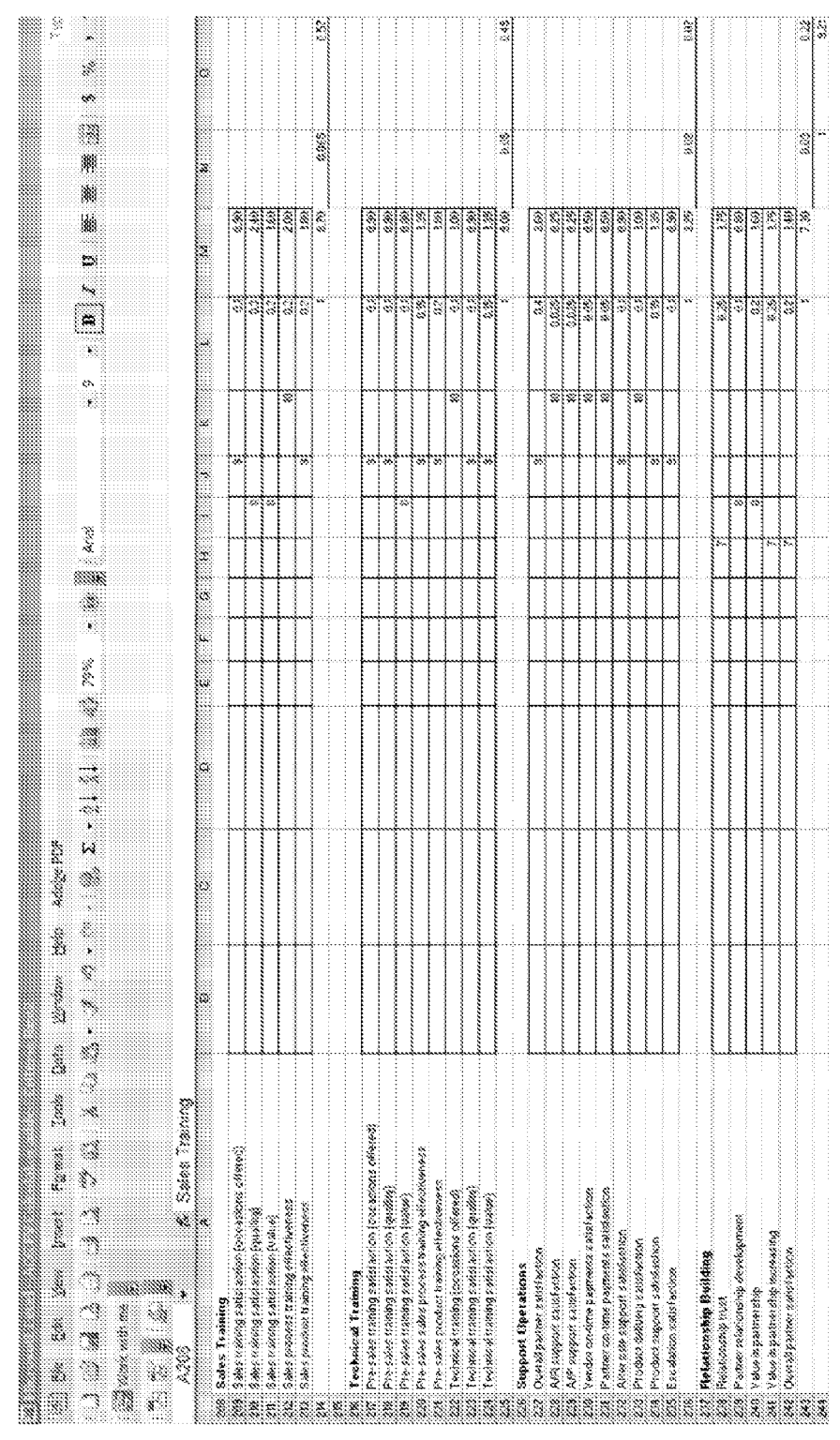

FIGS. 17A-17B shows a detail table of Vendor Partner Input detail and totals by category.

Figure 18A:
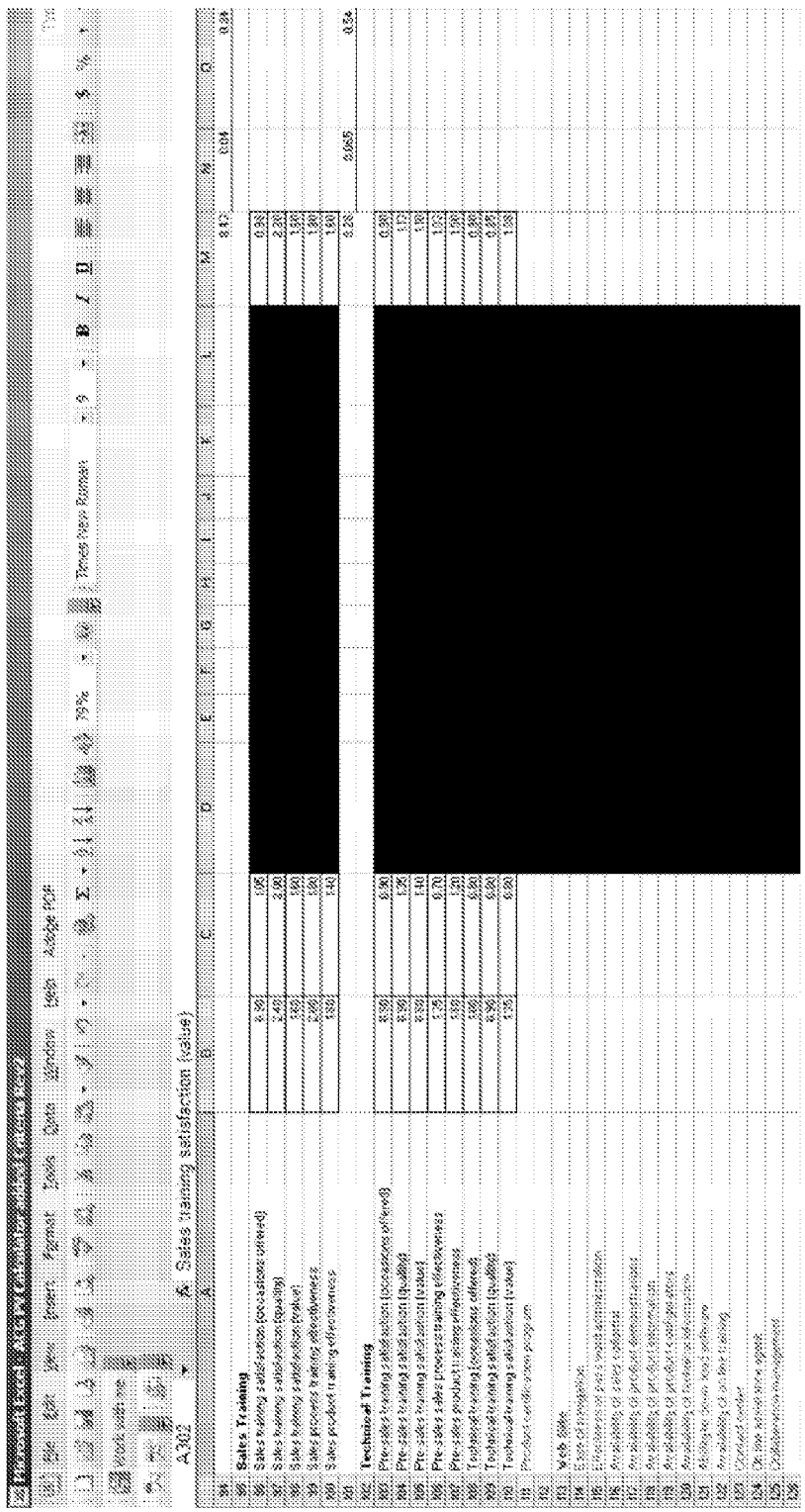
Figure 18B:
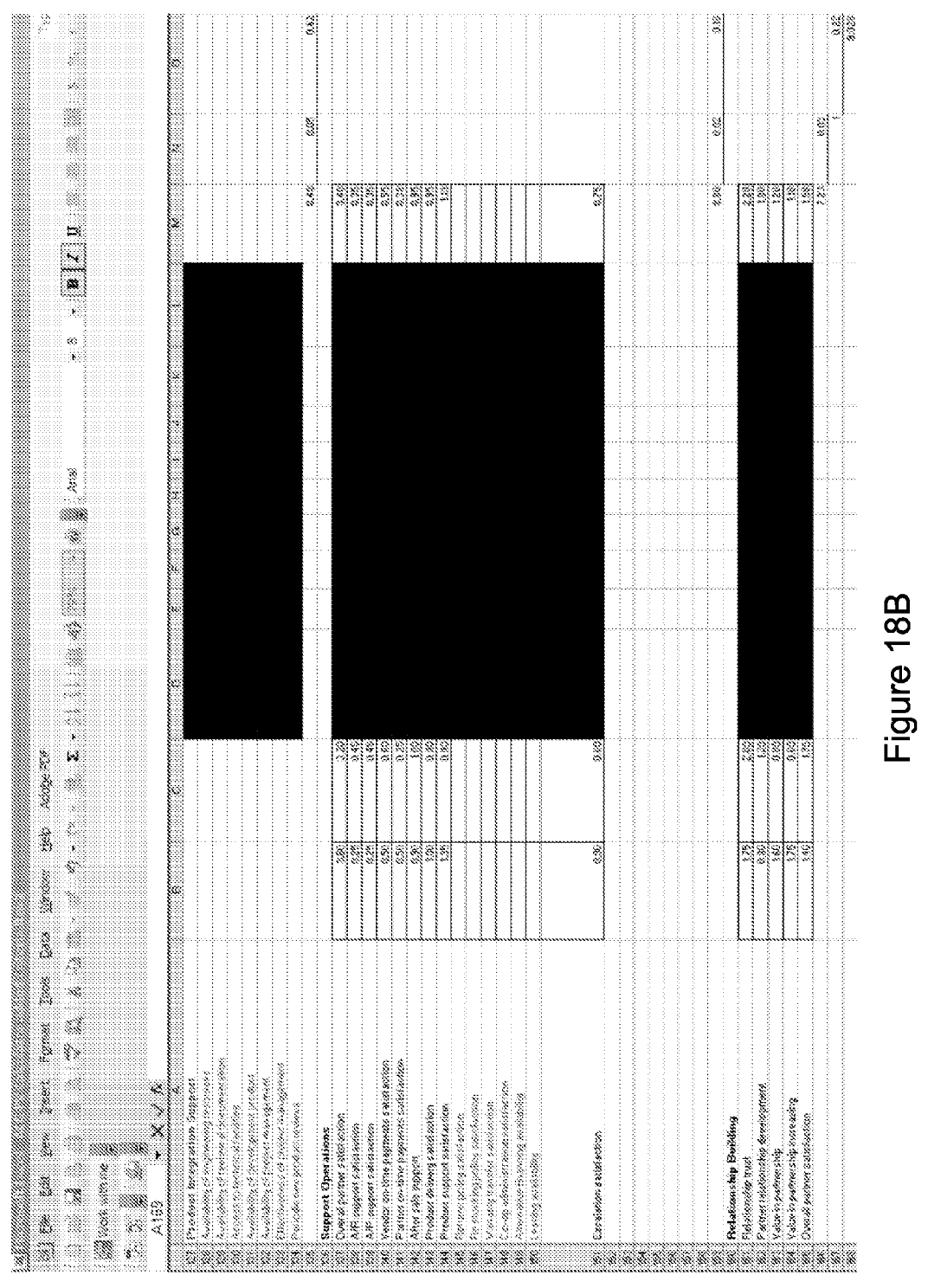
Figure 24:
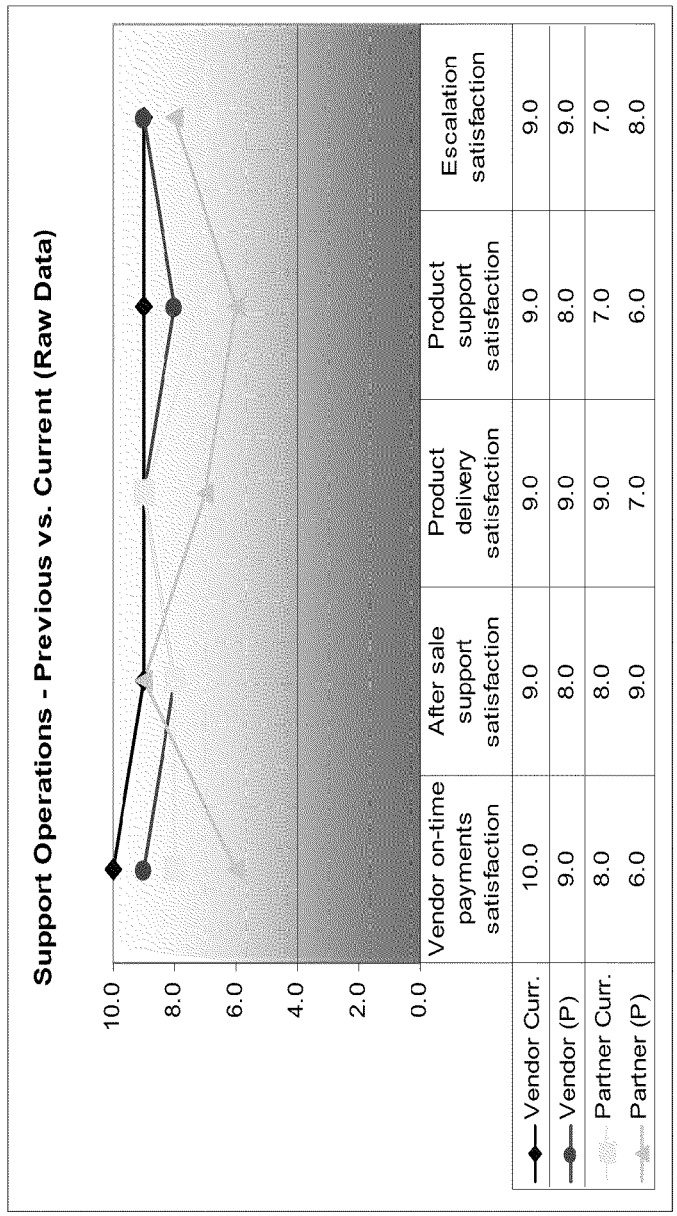
FIG. 24 shows a report showing the comparison of the vendor perception compared to the partner perception over multiple periods.

FIGS. 18A-18B shows a table of Vendor/Management that shows vendor/partner data totals results against expected and additional criteria to be considered for addition.

Figure 19A:
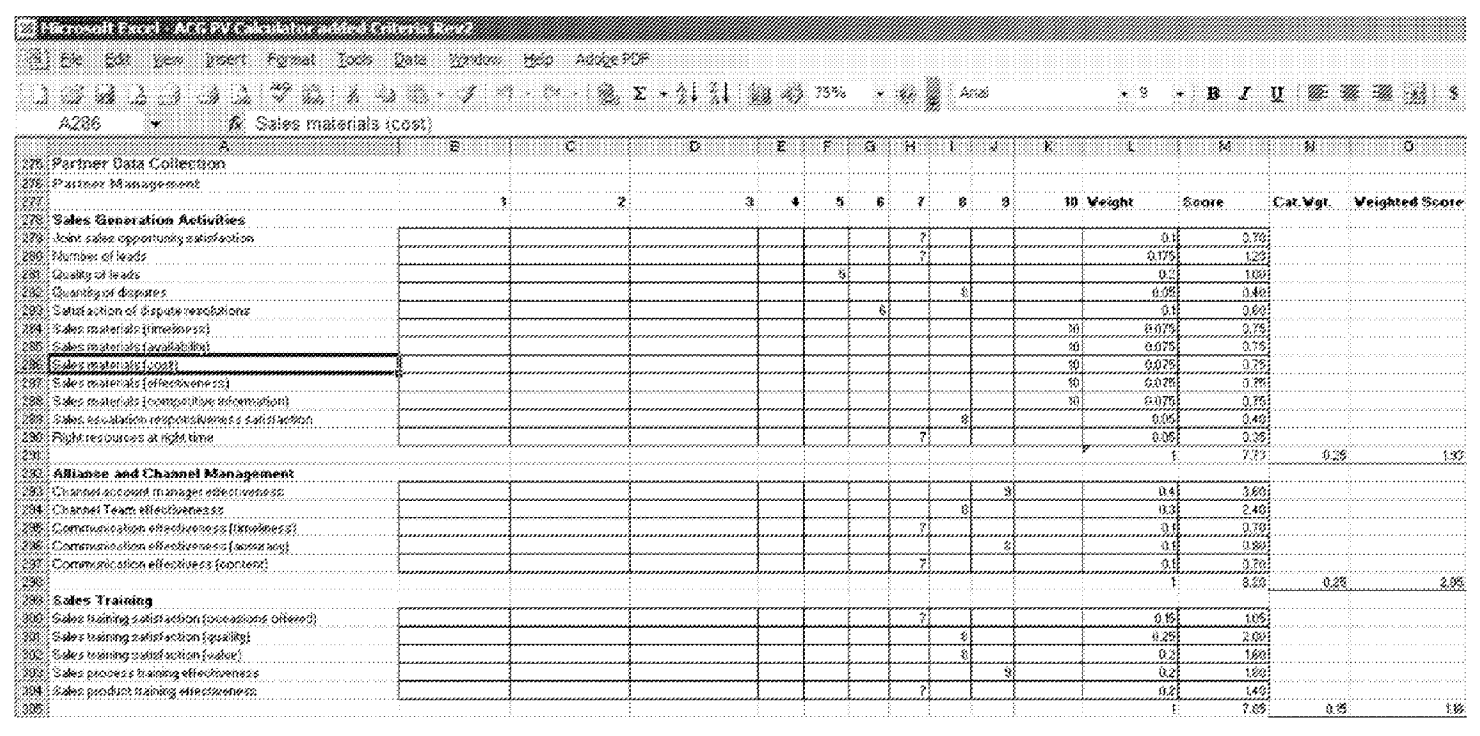
Figure 19B:
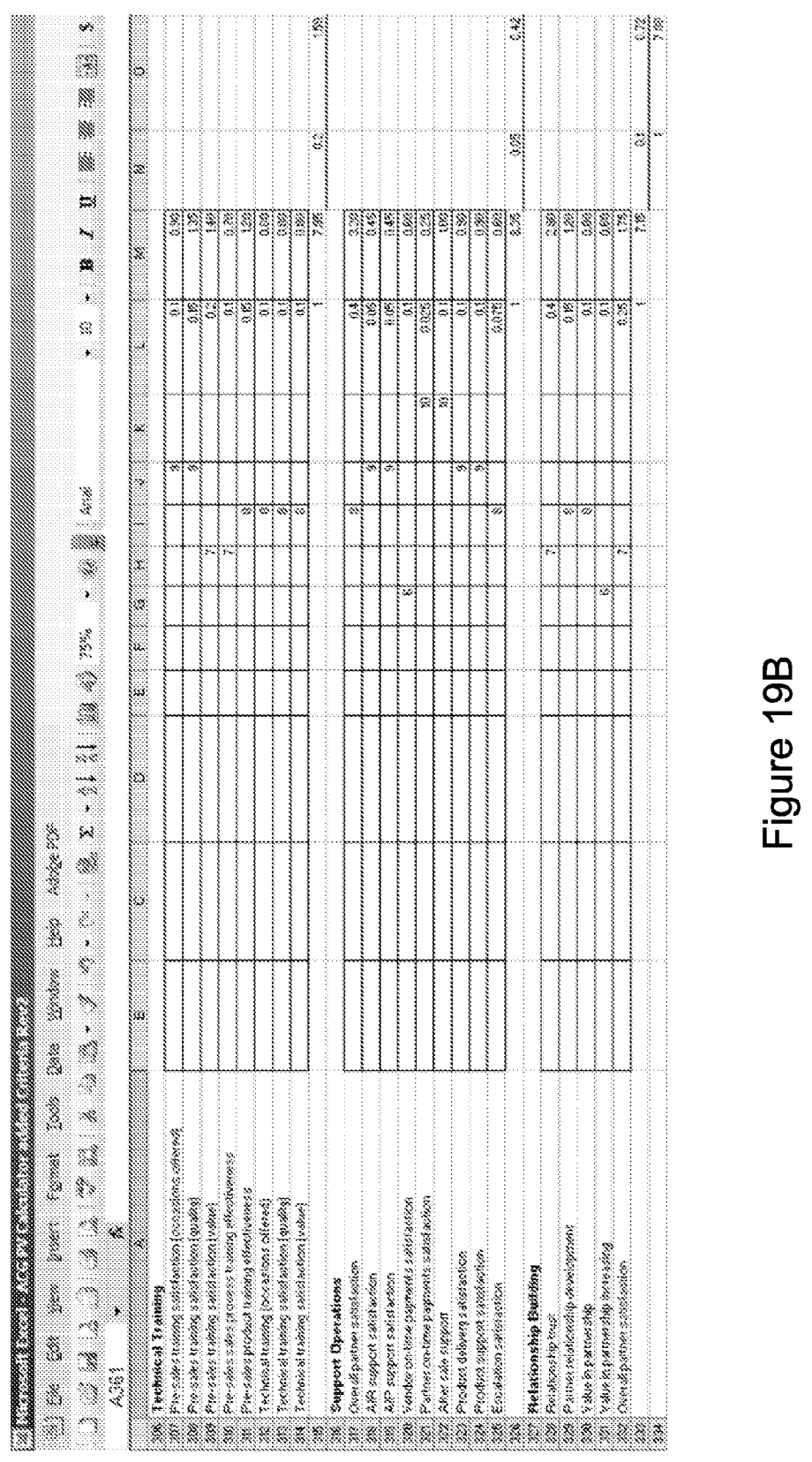

FIGS. 19A-19B is a table that shows Partner Management, Partner Input detail and category totals.

FIGS. 20A-20B shows a table of Partner Management criteria compared against possible cross functional impacts.

FIGS. 21A-21B shows a table of Partner Selection categories measured against possible Partner Management impacts.

Figure 22B:
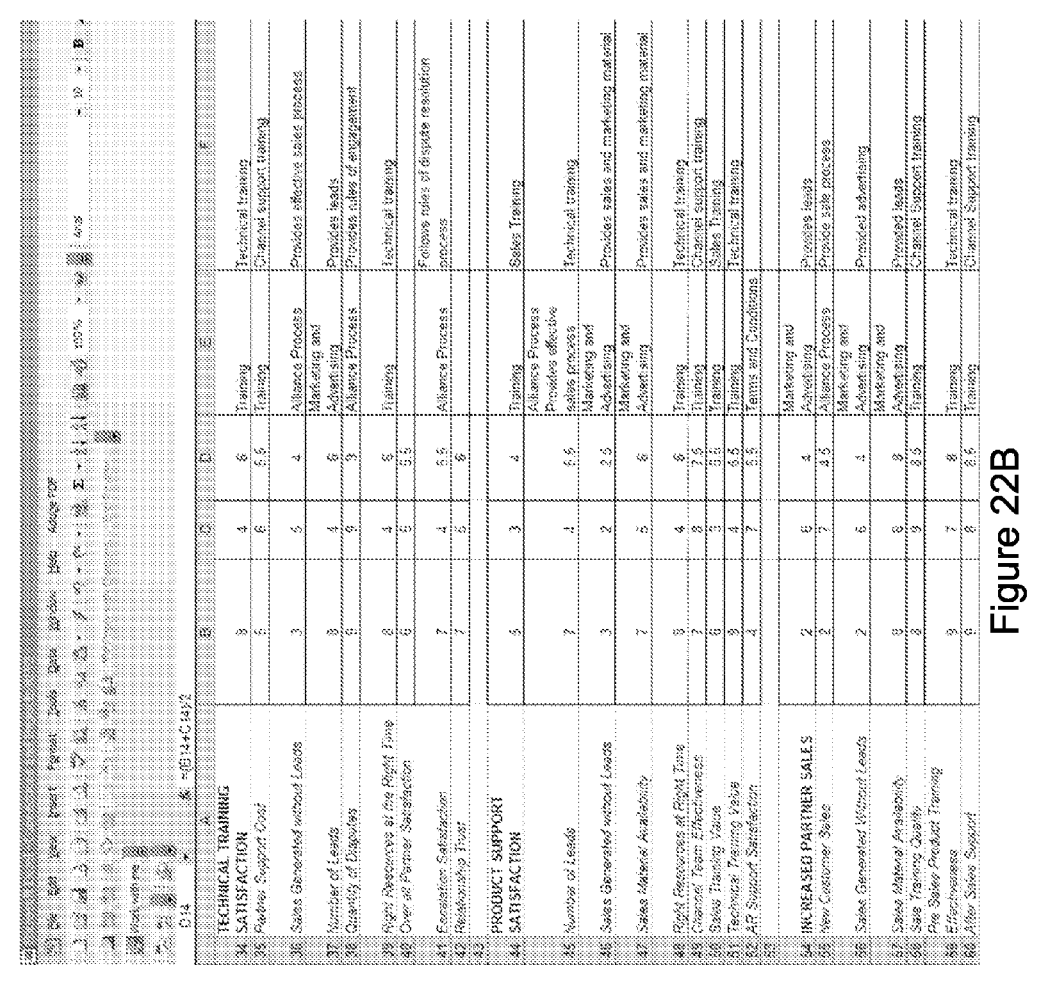

FIGS. 22A-22B shows a table of Partner Agreement categories measured against possible Partner Management impacts.

Figure 23A:
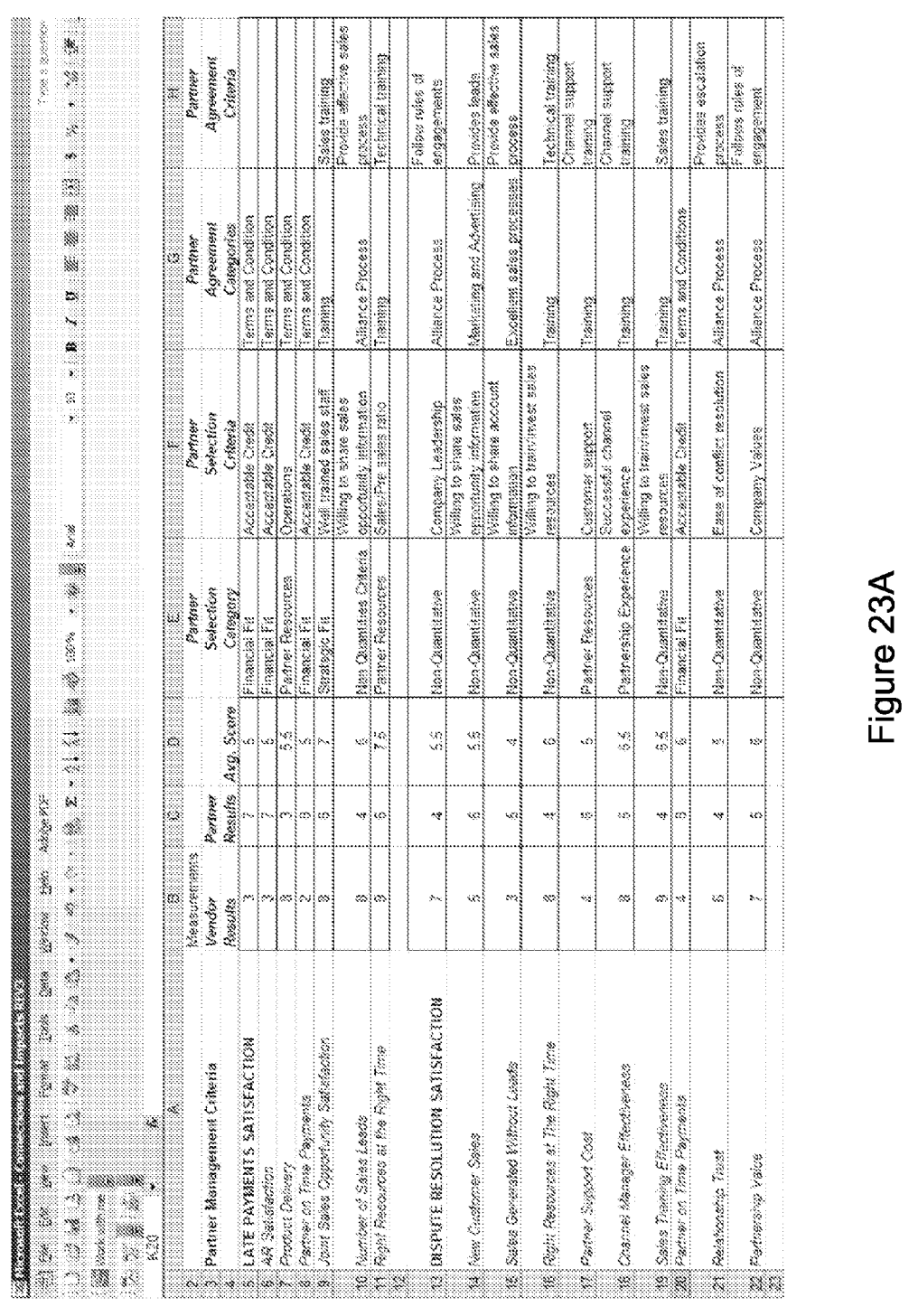
Figure 23B:
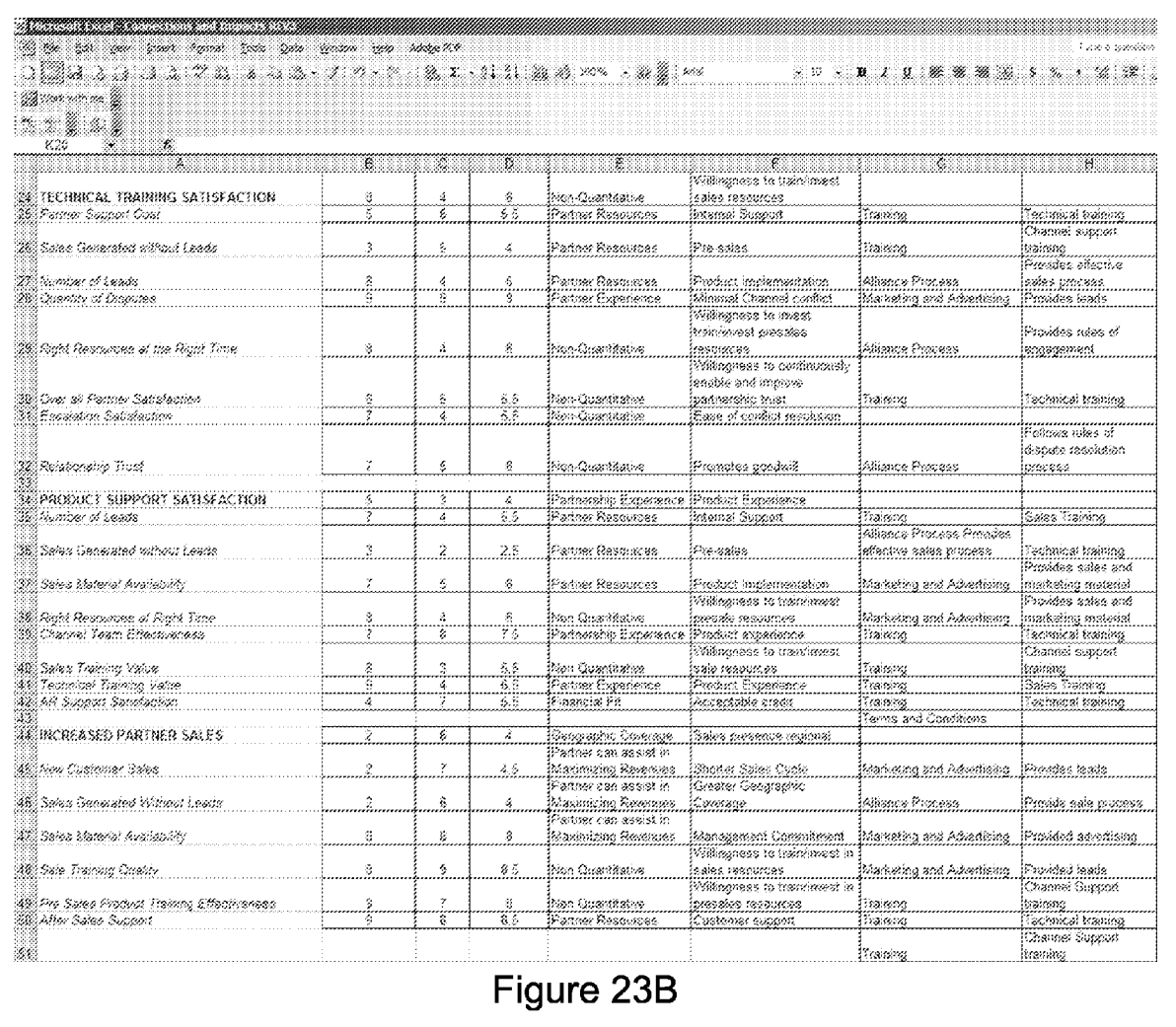

FIGS. 23A-23B is a table that shows Partner Management criteria measured against cross functional details for Partner Selection and Partner Agreement.

The following report shows a practical method for an actual industrial situation.

Sample 1: Attachment of New Invention that Creates Industry Standards for Business Partnerships and Alliances The attached figures incorporated herein may be used in conjunction with multiple companies allows the new invention to create standards information for the included industry. This is because the variables measured are the some for each company included in the industry and by combining and then averaging the results data for all companies included in an industry set will result in an industry or standard average for the measured industry.

In a specific implementation, a feature of invention is a repeatable process for the capture of weighted and categorized measurements for Partner Selection, Partner Agreement and Partner Management that will benchmark current partnership states, identify specific areas for partnership improvement, establish standards and essential data and reengage partnerships that will provide the ability to optimize partnership results through continuous partner life cycle process improvement. This process will result in the Partner Value calculation that measures partnership health and opportunity. An additional result of this engagement will be the reengagement of program partners. Over time, the collection and processing of the data and when combined with the results data of other companies in the same industry will result in industry standards for the included industry. Over time, the collection and processing of the data will allow companies to improve alliance and business partnership results and create knowledge and business intelligence data that will accurately predict future results.

Process

Pre-Meeting: Identify and schedule management, staff and partners for kick-off meeting using kickoff-meeting criteria below.

Kick-Off Meeting Overview

The purpose of the kick-off meeting is to assign tasks and confirm/create the following:

Create Mission Statement for project and, under a separate heading, for partners
  Announce project to partners and press
  Project objectives
  Project schedule
  Project roles and responsibilities
  Identification of customer resources for project coordination (project manager)
  Executive sponsor
  Responsible management and staff
  Select partners for input, analysis and feedback
  Other resources required to gather selected sell through segment information.
  Kick-Off Meeting Process
  Create Mission Statement for project and, under a separate heading, for partners
  Create announcement for partners and press
  Review organizational charts for sell through segment
  Engage partners for input collection, analysis and feedback
  Engage company organization touch points
  Review/gather measurements to be collected
  Assign tasks to management and staff to gather information and data regarding selection, agreement and management of sell through segment
  Assign tasks to staff to gather information and data from selected partners regarding partner's selection process, partnership agreements and management of partnership by company Meeting Set One: Partner Selection Optimization Process Development The purpose of meeting set one is to establish, define, select, measure and make repeatable the company's partner selection process so that partner selection optimization can be achieved. It will include a review of documentation and processes regarding the partner selection and the identification and selection of partner selection criteria and categories and the assignment of weights for the identified and selected measurements. It will include customer's partner selection policies, practices, processes, applicable historical information and qualitative inputs. A number of interviews will be conducted with responsible management and staff.

Meeting Set One Process

1. Collect/Review Paper and Electronic Information
  Paper Documents
  Electronic Documents
  Website Information including PRM solutions 2. Interview selected management and staff that have input into the design of partner selection processes. Discuss, select and assign criteria and categories and gather input as to the weighting of criteria and categories. Capture inputs regarding qualitative criteria and categories.
  Partner Selection criteria
  Partner Selection categories
  Partner Selection groups
  Ranking scales
  Weighting scales
  Add customer selection criteria and categories
  Improvement opportunities to be measured 3. Interview selected management and staff that have input into the identification and selection of potential partners. Discuss, select and assign criteria and categories and gather input as to the weighting of criteria and categories. Capture inputs regarding qualitative criteria and categories.
  Partner Selection criteria
  Partner Selection categories
  Selection groups
  Ranking scales
  Weighting scales
  Add customer selection criteria and categories
  Improvement opportunities to be measured
  Input appropriate information from selected partners
  Determine method and processes required for the continued collection of data inputs from both company and, partners, if required 4. Design report for Partner Selection
  Capture information from management and staff for input into partner selection tool
  Calculate partner selection benchmarks Calculate partner value input measurement Design partner selection reports, charts and diagrams that identifies selection process watch, re-measure and optimize opportunities Meeting Set Two: Partner Agreement Optimization Process Development The purpose of meeting set two is to establish, define, select, measure and make repeatable the company's partner agreement processes and to allow for the creation and measurement of customized partner agreements and processes so that partner agreement optimization can be achieved. It will include a review of documentation and processes regarding the company's partner agreement, the selection of partner agreement criteria and categories, assignment of weights for the identified and selected measurements and the creation of required processes and other agreement information to be measured. It will include customer's partner agreement policies, practices, processes, contracts, applicable historical information, other related data, and qualitative inputs. A number of interviews will be conducted with responsible management, staff and partners.

Meeting Set Two Process

1. Collect/Review Paper and Electronic Information

Paper Documents

Electronic Documents

Website Information including PRM solutions

2. Interview selected management and staff that have input into the design and creation of partner agreements. Discuss, select and assign criteria and categories, and, gather input as to the weighting of criteria and categories. Capture inputs regarding qualitative criteria and categories. Determine responsible staff required to provide added agreement processes.

Partner Agreement criteria

Partner Agreement categories

Partner Agreement groups

Ranking scales

Weighting scales

Create additional standards and supporting processes, and, gain initial management approval Add customer agreement criteria, categories and measurements for created processes Determine method and processes required for the continued collection of data inputs from both company and partners Improvement opportunities to be measured 3. Interview selected partner's management that has responsibility and input for the negotiation of the partnership. Discuss, select and assign criteria and categories, and, gather input as to the weighting of criteria and categories. Capture inputs regarding qualitative criteria and categories. This step cannot be started until additional processes and inputs are gathered and agreed upon in previous step two (2).

Partner Agreement criteria

Partner Agreement categories

Partner Agreement groups

Ranking scales

Weighting scales

Collect partner agreement inputs, criteria, categories and feedback

Determine method and processes required for the continued collection of data inputs from partners Improvement opportunities to be measured 4. Review results of combined inputs including, criteria, categories, weights and processes from both company and partners. Review, formalize and approve additional processes and related measurements.

Design Master Partnership Agreement from agreed upon results

Design processes to enable modification of agreement as required during partner negotiations.

5. Design report for Partner Agreement

Capture information from management and staff for input into partner agreement tool Capture information from partner management for input into partner agreement tool Calculate partner agreement benchmarks Calculate partner value input measurement Meeting Set Three: Partner Management Optimization Process Development The purpose of meeting set three is to establish, define, select, measure and make repeatable the company's partner management processes so that partner management optimization can be achieved. It will include a review of documentation and processes regarding the company's partner management processes, the selection of company partner management agreement criteria and categories, assignment of weights for the identified and selected measurements and the creation of required processes and other management information to be measured. It will include customer's partner management policies, practices, processes, applicable historical information, other related data, and qualitative inputs. A number of interviews will be conducted with responsible management, staff and partners.

Meeting Set Three Process

1. Collect/Review Paper and Electronic Information

Paper Documents

Electronic Documents

Website Information including PRM solutions

2. Interview selected management and staff that have input into the design and creation of partner management strategies. Discuss, select and assign criteria and categories, and, gather input as to the weighting of criteria and categories. Capture inputs regarding qualitative criteria and categories. Determine responsible staff required to provide added partner management processes and measurements.

Partner Management criteria

Partner Management categories

Partner Management groups

Ranking scales

Weighting scales

Create additional management standards and supporting processes, and, gain initial company management approval Add customer management criteria, categories and measurements for created processes Improvement opportunities to be measured Determine method and processes required for the continued collection of data inputs from both company and partners 3. Interview selected partner's management that has responsibility for the negotiation of the partnership agreement, continued management and support of the partnership, achievement of results, and responsible for partner's long-term business planning. Discuss, select and assign criteria and categories, and, gather input as to the weighting of criteria and categories. Capture inputs regarding qualitative criteria and categories. This step cannot be started until additional processes and inputs are gathered and agreed upon in previous step two (2).

Partner Management criteria

Partner Management categories

Partner Management groups

Ranking scales

Weighting scales

Collect partner management inputs, criteria, categories and feedback

Determine method and processes required for the continued collection of data inputs from partners Improvement opportunities to be measured 4. Review results of partner management combined inputs including, criteria, categories, weights and processes from both company and partners.

Review, formalize, and approve additional processes and related measurements.

Design processes to enable modification of agreement as required during partner negotiations that may be measured and are important to Partner Management.

5. Design report for Partner Management

Capture information from management and staff for input into partner management tool Capture information from partner management for input into partner agreement tool Calculate partner management benchmarks Calculate partner value input measurement Deliver partner management tool, charts and diagrams Deliver report that identifies management process which, re-measure and optimize opportunities Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention. This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of graphing by computer a partnership value of a partnership between a partner and a company, comprising:

creating a partner management index, wherein the index comprises a plurality of groups, each group comprises a plurality of categories, and each category comprises a plurality of criteria to be rated during an evaluation of at least one of the partner or the company;

assigning a weight to the index and to each group, category, and criteria so that the index is associated with an index weight, and each group is associated with a group weight, each category is associated with a category weight, and each criteria is associated with a criteria weight, wherein the weights indicate an importance of the index, group, category, and criteria to at least one of the company or the partner;

rating the criteria in each category during a first evaluation of at least one of the company or the partner at a first time, whereby each criteria in a category is associated with a criteria rating;

multiplying each criteria rating with the associated criteria weight to generate a plurality of criteria scores, whereby each criteria in the category is associated with a criteria score;

summing the associated criteria scores in each category of criteria to generate a plurality of criteria score totals, whereby each category is associated with a criteria score total;

in a computer, multiplying each criteria score total of each category with the associated category weight to generate a plurality of category scores, whereby each category is associated with a category score;

summing the associated category scores in each group of the index to generate a plurality of category score totals, whereby each group is associated with a category score total;

multiplying the associated category score total with the associated group weight to generate a plurality of group scores, whereby each group is associated with a group score;

summing the associated group scores to generate a value for the partner management index; and graphing by a computer a first value of the partner management index, wherein the first value is the value for the partner management index at the first time, and the first value indicates a partnership value of the partnership between the partner and the company at the first time.

2. The method of claim 1 further comprising:

rating the criteria in each category during a second evaluation of the partner of the company at a second time;

repeating the steps of multiplying each criteria rating, summing the associated criteria scores, multiplying each criteria score total, summing the associated category scores, multiplying the associated category score total, and summing the associated group scores;

graphing by the computer a second value of the partnership management index, wherein the second value is the value of the partner management index at the second time, and the second value indicates a partnership value of the partnership between the partner and the company at the second time; and graphing by the computer a line from the first value of the partnership management index to the second value of the partnership management index.

3. The method of claim 2 wherein a period of time between the first time and the second time is about one month.

4. The method of claim 2 wherein a period of time between the first time and second time is about four months.

5. The method of claim 2 wherein at the first time, the weights assigned to the index, groups, categories, and criteria are the same as the weights assigned to the index, groups, categories, and criteria at the second time.

6. The method of claim 2 wherein a difference between the first value and the second value indicates a change in the partnership value of the partnership.

7. The method of claim 1 wherein one of a criteria of the plurality of criteria comprises after sale support satisfaction.

8. The method of claim 1 wherein one of a criteria of the plurality of criteria comprises product delivery satisfaction.

9. A method employing indexes to calculate a value of a business partnership and to facilitate optimization of the value of the business partnership, the method comprising:

creating a partner selection index, a partner agreement index, and a partner management index, wherein each index comprises a plurality of groups, each group comprises a plurality of categories, and each category comprises a plurality of criteria to be rated during an evaluation of a partner;

associating weights to the indexes, groups, categories, and criteria, whereby each index is associated with an index weight, each group is associated with a group weight, each category is associated with a category weight, and each criteria is associated with a criteria weight;

calculating a first value for a first partner selection index, wherein the first partner selection index is associated with a first partner, and the first partner is selected based on the first value;

calculating a second value for a first partner agreement index, wherein the first partner agreement index is associated with the first partner;

after the calculating a first value for a first partner selection index and the calculating a second value for a first partner agreement index, collecting information during a first evaluation of the first partner, wherein the collected information is collected using a spreadsheet, wherein the spreadsheet comprises first and second columns, wherein the first column comprises the plurality of criteria and the second column comprises a plurality of criteria ratings, whereby each criteria rating is associated with a criteria;

calculating a third value for a first partner management index based on the collected information during the first evaluation of the first partner, wherein the calculating a third value for a first partner management index comprises:

weighting each criteria rating in the spreadsheet with the criteria weight associated with each criteria to generate a plurality of criteria scores;

weighting the plurality of criteria scores with the category weight associated with each category to generate a plurality of category scores;

weighting the plurality of category scores with the group weight associated with each group to generate a plurality of group scores; and weighting the plurality of group scores with the index weight associated with the first partner management index to calculate the third value;

in a computer, calculating a partner value of the first partner based on the first value of the partner agreement index, the second value of the first partner agreement index, and the third value of the first partner management index; and outputting a report from a computer, wherein the report comprises the partner value.

10. The method of claim 9 wherein the report is an electronic document and the electronic document comprises first, second, and third summary regions, wherein the first summary region the first partner selection index and the groups in the first partner selection index, the second summary region comprises the first partner agreement index and the groups in the first partner agreement index, and the third summary region comprises the first partner management index and the groups in the first partner management index.

11. The method of claim 9 wherein weights of the indexes are expressed as percentages and the percentages add up to 100 percent.

12. The method of claim 9 wherein the calculating a partner value comprises summing the first, second, and third values.

13. The method of claim 9 wherein the first, second, and third values are expressed as percentages, the calculating a partner value comprises summing the first, second, and third values, and a difference between the partner value and 100 percent indicates a degree of optimization available in the business partnership.

14. The method of claim 9 wherein the collecting information during a first evaluation of the first partner comprises collecting actual revenue figures and expected revenue figures, and the calculating a third value for a first partner management index comprises calculating ratios of the actual revenue figures to the expected revenue figures, wherein the ratios are the plurality of criteria ratings.

* * * * *